(12) United States Patent
Choi et al.

(10) Patent No.: US 11,050,866 B1
(45) Date of Patent: Jun. 29, 2021

(54) MOBILE TERMINAL

(71) Applicant: LG ELECTRONICS INC., Seoul (KR)

(72) Inventors: Hakho Choi, Seoul (KR); Ahrah Koh, Seoul (KR); Sungdo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/987,341

(22) Filed: Aug. 6, 2020

(30) Foreign Application Priority Data

Dec. 23, 2019 (WO) ............... PCT/KR2019/018322

(51) Int. Cl.
*H04M 1/02* (2006.01)

(52) U.S. Cl.
CPC ....... *H04M 1/0268* (2013.01); *H04M 1/0233* (2013.01); *H04M 1/0264* (2013.01); *H04M 1/0277* (2013.01)

(58) Field of Classification Search
CPC ............ H04M 1/0268; H04M 1/0277; H04M 1/0264; H04M 1/0233; G09G 2380/02; G09G 5/14; G09G 2360/04
USPC ........................................................ 455/566
See application file for complete search history.

(56) References Cited

U.S. PATENT DOCUMENTS

2016/0307545 A1* 10/2016 Lee .................... G09G 5/346

FOREIGN PATENT DOCUMENTS

| CN | 109741682 | 5/2019 |
|---|---|---|
| KR | 1020050061870 | 6/2005 |
| KR | 1020160141255 | 8/2016 |
| KR | 1020180006533 | 1/2018 |
| KR | 1020190062855 | 6/2019 |

OTHER PUBLICATIONS

PCT International Application No. PCT/KR2019/018322, Notification of Transmittal of The International Search Report and The Written Opinion of The International Searching Authority, or Declaration dated Sep. 23, 2020, 12 pages.

* cited by examiner

*Primary Examiner* — Shaima Q Aminzay
(74) *Attorney, Agent, or Firm* — Lee, Hong, Degerman, Kang & Waimey

(57) ABSTRACT

Disclosed is a mobile terminal having a flexible display. The mobile terminal includes a first frame, a second frame coupled to the first frame to move in a first or second direction, a third frame coupled to the second frame to move in the first or second direction. The mobile terminal further includes a flexible display having a first region on a front side of the mobile terminal, a second region on a backside of the mobile terminal, and a third region between the first and second regions, and the third region is disposed on the front side or backside of the mobile terminal selectively. The mobile terminal further includes a drive unit configured to move the second and third frames in the first or second direction, and the drive unit is further configured to be manually operable.

20 Claims, 22 Drawing Sheets

(a)

(b)

(a)

(b)

(a)

(b)

(c)

(a)

(b)

(a)

(b)

(a)

(b)

(a)

(b)

(a)

(b)

(a)

(b)

MOBILE TERMINAL

CROSS-REFERENCE TO RELATED APPLICATION(S)

Pursuant to 35 U.S.C. § 119 (a), this application claims the benefit of an earlier filing date and right of priority to International Application No. PCT/KR2019/018322, filed on Dec. 23, 2019, the contents of which are hereby incorporated by reference herein in its entirety.

BACKGROUND OF THE DISCLOSURE

Field of the Disclosure

The present disclosure relates to a mobile terminal, and more particularly, to a mobile terminal capable of adjusting a size of an available display or screen.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Functions of a display device have been diversified. For example, such functions may include data & audio communications, photo & video shooting through cameras, audio recording, music file playback through a speaker system, and a function of outputting an image or video to a display. Some terminals are additionally equipped with an electronic game play function or perform a multimedia player function. Particularly, a recent mobile terminal may receive multicast signals that provide visual contents such as broadcasts, videos and television programs. In order to perform the extended functions, the mobile terminal is basically connected to other devices or networks using various communication protocols and can provide a user with ubiquitous computing. In particular, a mobile terminal has been evolved into a smart device that enables the connectivity to networks and the ubiquitous computing.

Meanwhile, a flexible display capable of considerable deformation with sufficient elasticity has been developed recently. Such a flexible display can be deformed enough to be rolled up into a body of the mobile terminal. The mobile terminal is capable of accommodating a rolled-up flexible display and projecting the display in a desired size out of its body. Hence, using the flexible display, the mobile terminal can have a compacter structure and a display extendable in a desired size. Thus, the mobile terminal needs to be improved in structural and functional aspects to maximize the advantages attributed to the flexible display.

SUMMARY OF THE DISCLOSURE

Accordingly, embodiments of the present disclosure are directed to a mobile terminal that substantially obviates one or more problems due to limitations and disadvantages of the related art.

One object of the present disclosure is to provide a mobile terminal configured to adjust an available or effective size of a display or screen stably and reliably using a flexible display.

Another object of the present disclosure is to provide a mobile terminal configured to non-limit a deformed portion of a flexible display to a specific position.

Another object of the present disclosure is to provide a mobile terminal configured to stably support an extended flexible display.

Another object of the present disclosure is to provide a mobile terminal configured to prevent a deformed portion of a flexible display from being broken by external shocks.

Further object of the present disclosure is to provide a mobile terminal configured to accurately form a size of a screen intended by movement of a flexible display.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a mobile terminal according to one embodiment of the present disclosure may include a first frame, a second frame movably coupled to the first frame and configured to move in a first direction against the first frame or a second direction opposite to the first direction, a third frame coupled to the second frame movably and configured to move in the first or second direction against the second frame, a flexible display including a first region disposed on a front side of the mobile terminal and coupled to the first frame, a second region disposed on a backside of the mobile terminal and coupled to the third frame, and a third region extended between the first and second regions, wherein the third region is disposed on the front side or backside of the mobile terminal selectively according to a moving direction of the second frame by being rolled around the second frame, and a drive unit configured to move the second frame in the first or second direction against the first frame and move the third frame in the first or second direction against the second frame, wherein the drive unit is further configured to be operable manually.

The drive unit may be configured to switch the mobile terminal from the first state to the second state by moving the second and third frames in the second direction to extend a screen on the front side of the mobile terminal, only the first region of the flexible display may be disposed on the front side of the mobile terminal in the first state, the third region may be disposed on the mobile terminal together with the first region in the second state, and for the switching to the second state, the drive unit may be configured to withdraw the third region from the second region to the front side of the mobile terminal in response to the movement of the second frame in the first direction.

The drive unit may be configured to switch the mobile terminal from the first state to the second state by moving the second and third frames in the second direction to reduce the screen on the front side of the mobile terminal and the drive unit may be configured to contract the withdrawn third region to the second frame from the front side of the mobile terminal for the switching to the first state.

The drive unit may include an actuator coupled to each of the first and second frames and configured to generate a drive force to move the second frame in the second direction. The actuator may include an elastic member configured to be deformed in case of the movement of the second frame in the first direction and restored in case of the movement of the second frame in the second direction. The actuator may include a first rail coupled to the first frame and configured to receive the elastic member and a second rail receiving the elastic member therein by being coupled to the second frame and slidably coupled to the first rail.

The drive unit may include a damper coupled to each of the first and second frames and configured to reduce a moving speed of the second frame when the second frame moves in the first or second direction. The damper may include a hydraulic device configured to connect the first and second frames together. The damper may include a cylinder coupled to one of the first and second frames and filled with prescribed working fluid and a plunger coupled to the other one of the first and second frames and configured to reciprocate in the cylinder.

The drive unit may include a locker configured to maintain the second frame having moved in the first direction. The locker may include a latch and wherein the latch is configured to immovably engage with the first frame if the second frame moves in the first direction. The locker may include a first slot, a latch movably installed in the second slot, and a second slot formed in the first frame to receive the latch therein and oriented in a manner of being inclined at a prescribed angle with the first direction, wherein if the second frame moves in the first direction, the latch may be configured to engage with a wall of the inclined second slot. The locker may further include a third slot formed in the first frame to be connected to the second slot and guiding the latch to move in the first frame in the first or second direction. The first slot may be configured to be inclined in an opposite direction of the second slot at a prescribed angle with the first direction.

The drive unit may further include a releaser configured to unlock the second frame locked by the locker to be movable in the second direction. The releaser may be configured to disengage the latch from the first frame. The releaser may be configured to be manipulated outside the mobile terminal. The releaser may include a rod installed in the mobile terminal and applying a force to the latch while moved by an external force and a button configured to apply a force to the rod by an external force in a manner of being exposed to an outside of the mobile terminal.

The mobile may further include an auxiliary drive unit coupled to the third frame and the second frame and configured to apply tension to the third frame and the display coupled to the third frame. The auxiliary drive unit may include either an elastic member configured to apply a force to the third frame in a direction opposite to a moving direction of the third frame while deformed and restored or a hydraulic device configured to apply a force to the third frame in the direction opposite to the moving direction of the third frame using an internal fluid pressure.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE DISCLOSURE

Figure 1:
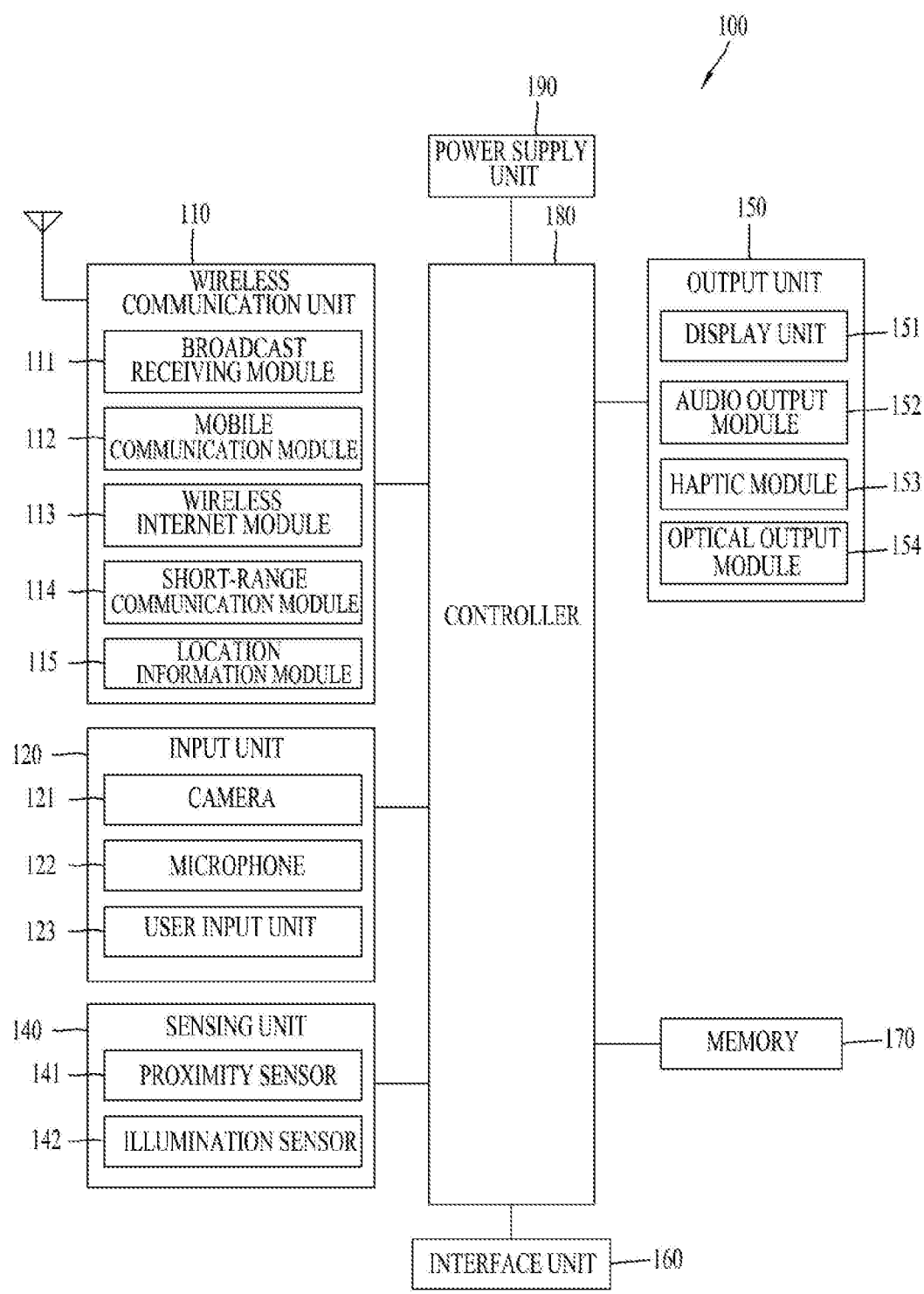
FIG. 1 is a block diagram showing an overall configuration of a mobile terminal according to the present disclosure.

Hereinafter, a mobile terminal and a controlling method thereof according to the present disclosure will be described in detail with reference to the accompanying drawings.

In the following description, the same or similar elements are denoted by the same reference numerals even though they are depicted in different drawings and redundant descriptions thereof will be omitted. With respect to elements used in the following description, the suffixes "module" and "unit" are used or combined with each other only in consideration of ease in the preparation of the description, and do not have or serve as different meanings. Accordingly, the suffixes "module" and "unit" may be interchanged with each other. In addition, in the following description, a detailed description for known functions and configurations incorporated herein will be omitted when it may make the subject matter disclosed in the present disclosure rather unclear. In addition, the accompanying drawings are provided only for a better understanding of the examples in the present disclosure and are not intended to limit the technical concept in the present disclosure. Therefore, it should be understood that the accompanying drawings include all modifications, equivalents and substitutions included in the scope and sprit of the present disclosure.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present disclosure, it will be further understood that the terms "comprises", includes," etc. specify the presence of stated features, numbers, steps, operations, elements, components, or combinations thereof, but do not preclude the presence or addition of one or more other features, numbers, steps, operations, elements, components, or combinations thereof. Further, for the same reasons, the present disclosure also covers any sub-combination excluding some features, integers, steps, operations, elements, or components from any predefined combination.

Examples of the present disclosure described below are to apply a flexible display to a mobile terminal. However, the principle and the configuration of the described examples may be applied to any devices having the flexible display with no changes.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in the FIG. 1A is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multi-media messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
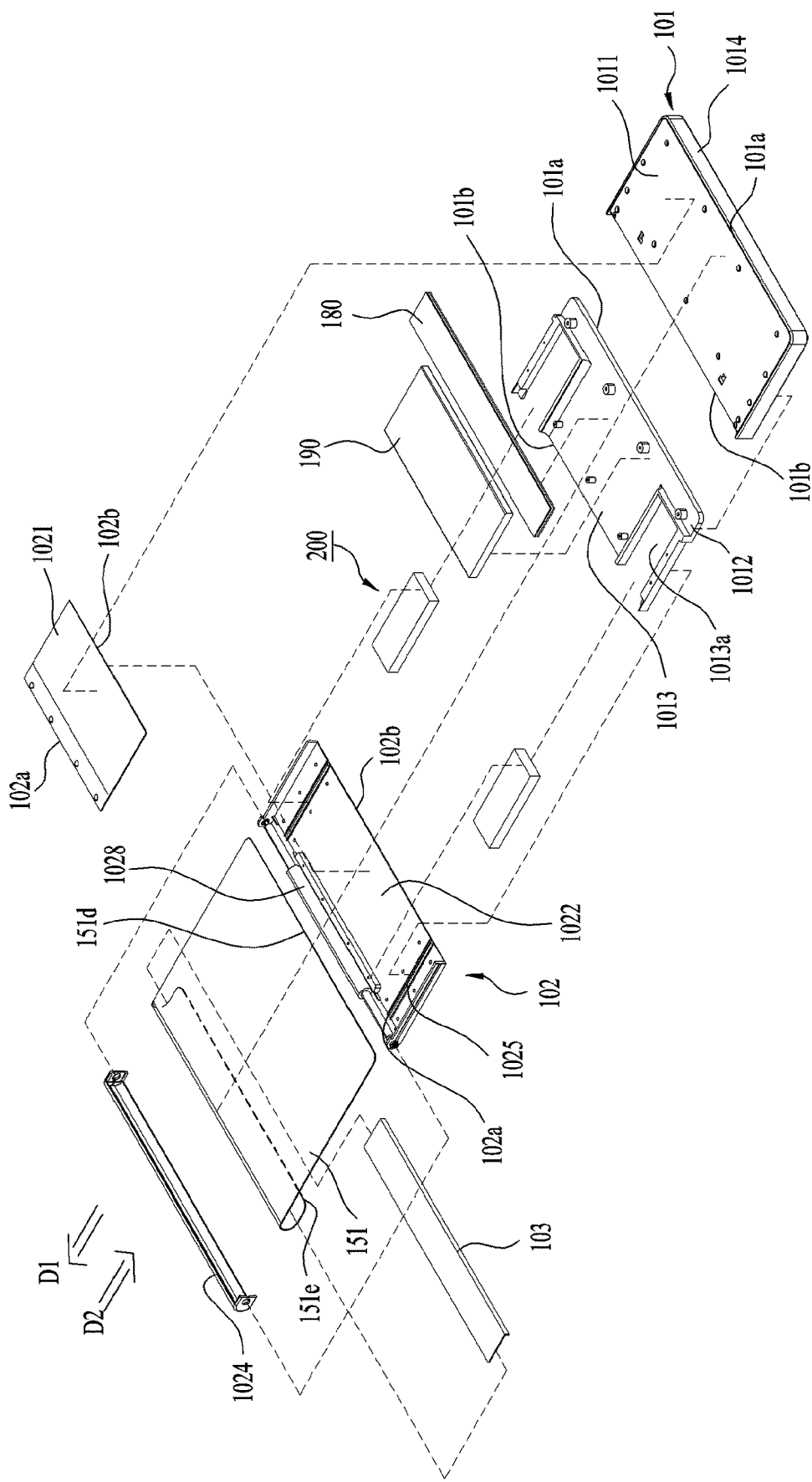
FIG. 2 is an exploded perspective view showing a mobile terminal according to the present disclosure.
Figure 3:
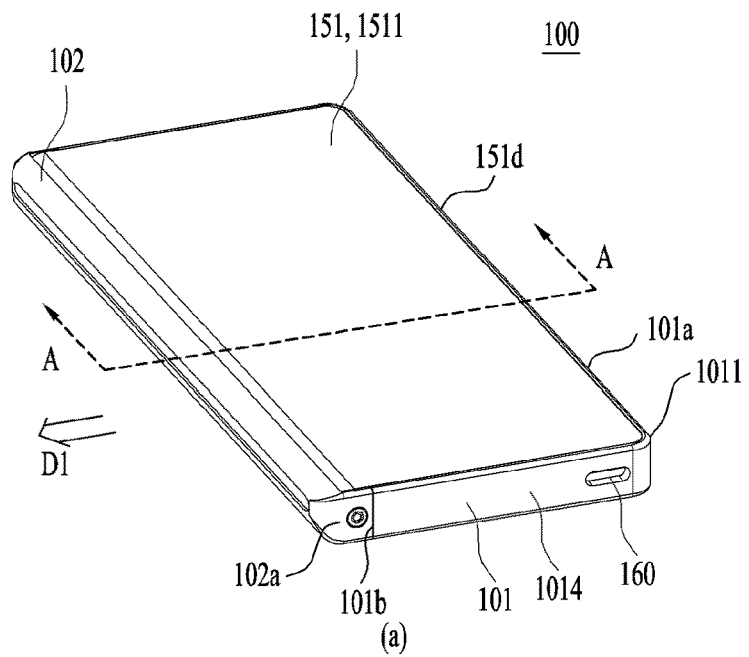
FIG. 3 is a perspective view showing first and second states of a mobile terminal viewed in one lateral side.
Figure 3:
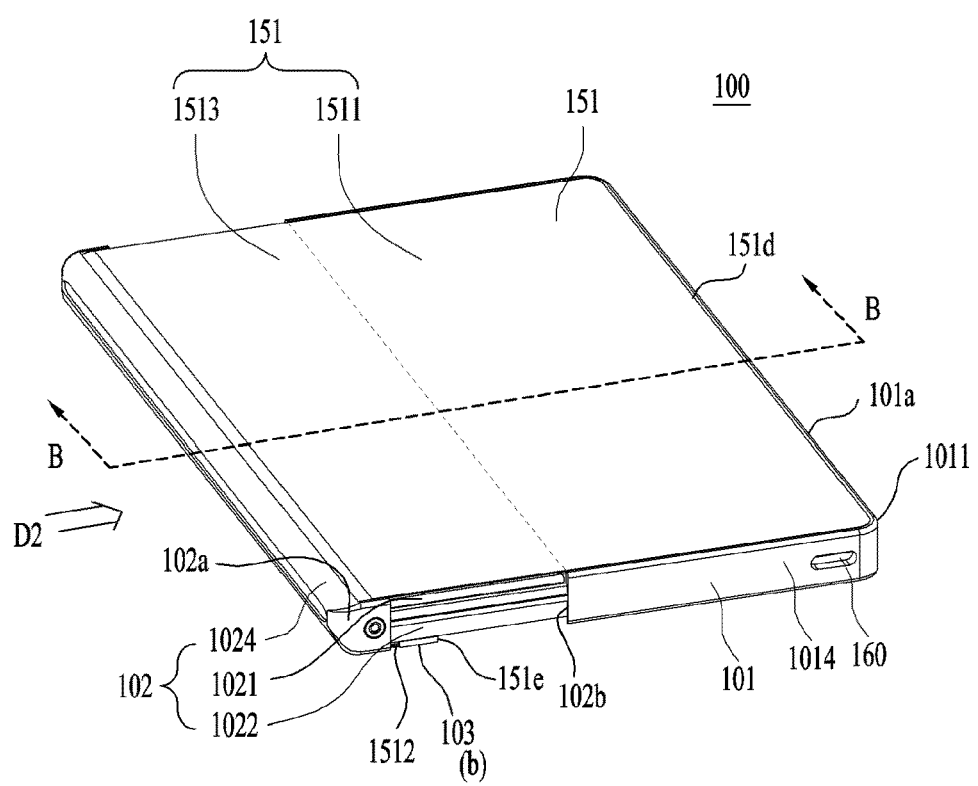
Figure 4:
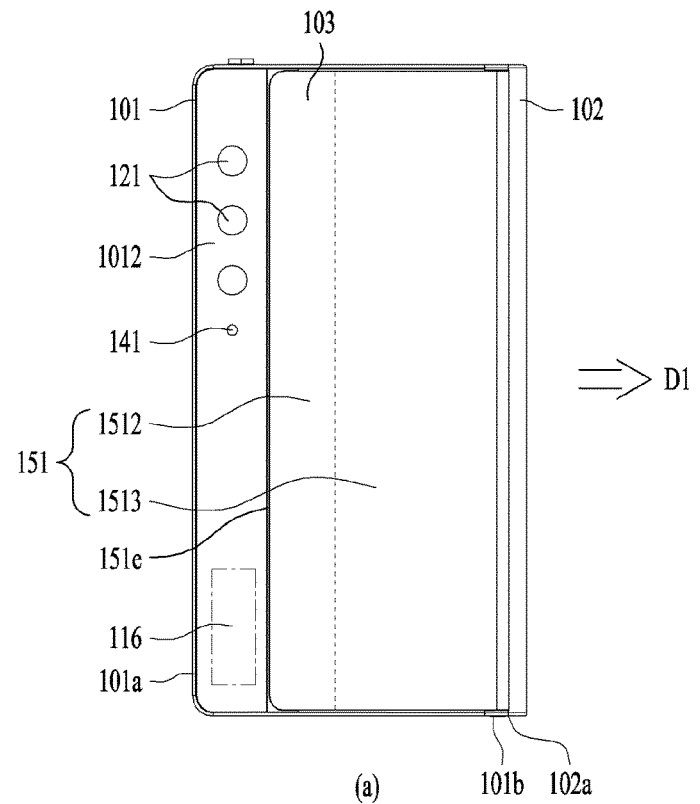
FIG. 4 is a backside view showing first and second states of a mobile terminal.
Figure 4:
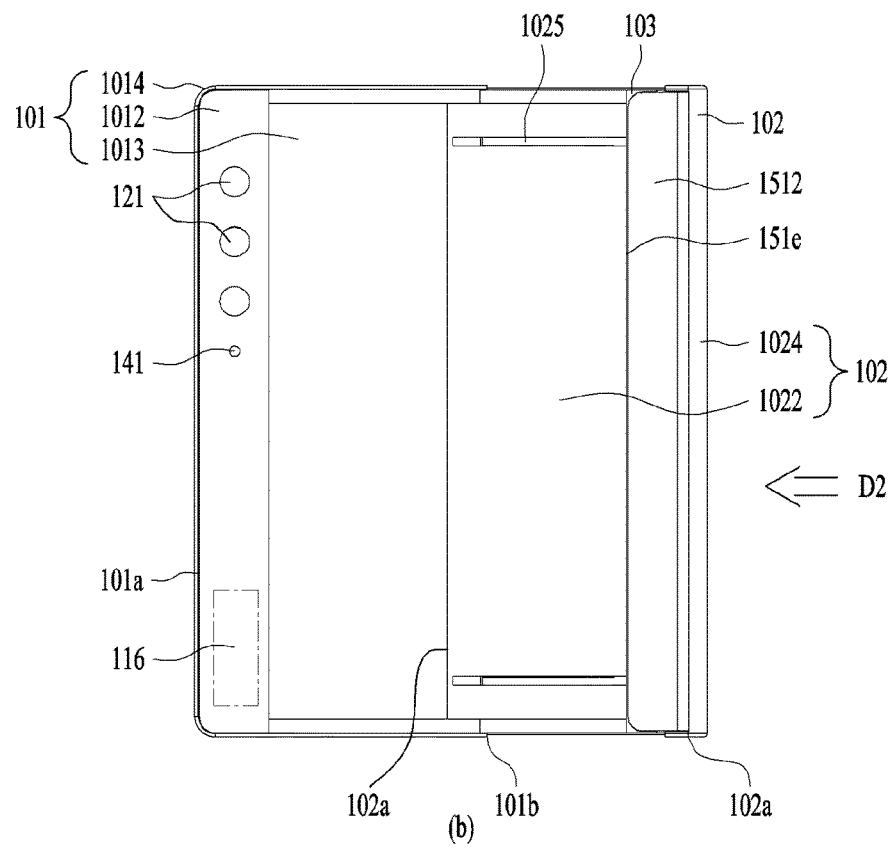
Figure 5:
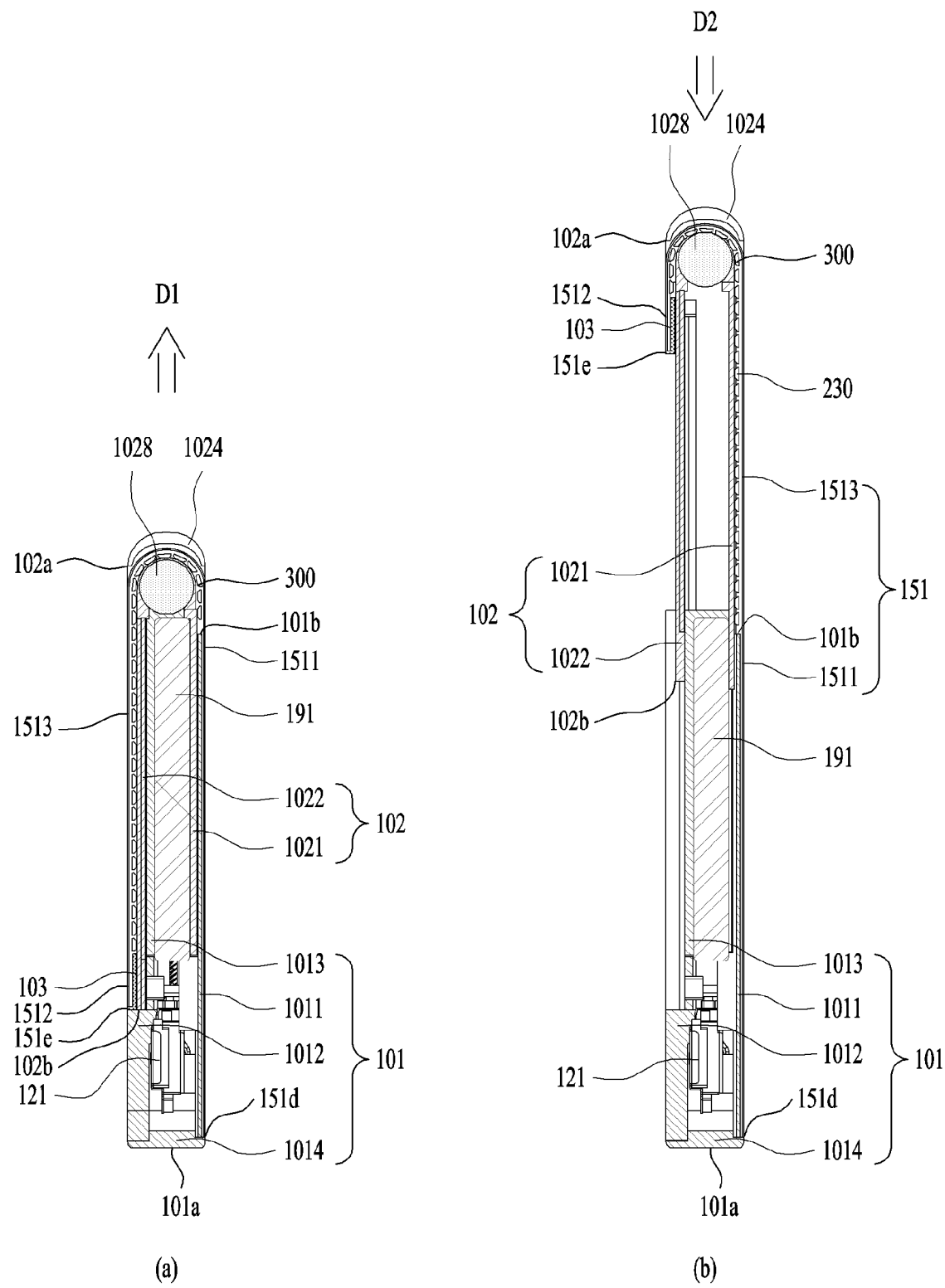
FIG. 5 is a cross-sectional view showing first and second states of a mobile terminal, obtained along the cutting lines A-A and B-B of FIG. 2, respectively.

FIG. 2 is an exploded perspective view showing a mobile terminal according to the present disclosure. FIG. 3 is a perspective view showing first and second states of a mobile terminal viewed in one lateral side. FIG. 4 is a backside view showing first and second states of a mobile terminal. FIG. 5 is a cross-sectional view showing first and second states of a mobile terminal, obtained along the cutting lines A-A and B-B of FIG. 2, respectively. In the above drawings, FIG. 3(a), FIG. 4(a) and FIG. 5(a) show a first state of a mobile terminal and FIG. 3(b), FIG. 4(b) and FIG. 5(b) show a second state of the mobile terminal.

As shown in the drawings, a mobile terminal 100 of a first state is contracted (or retracted) and has a size smaller than that of the mobile terminal 100 of a second state. Moreover, a size of a display 151 located on a front side of the mobile terminal 100 becomes smaller than that in a second state. On the other hand, the mobile terminal 100 of the first state is extended in a first direction D1 so as to switch to the second state. In the second state, a size of the mobile terminal 100 and a size of the display 151 located on the front side become greater than those of the first state. In the following description, a direction in which the mobile terminal 100 and the display 151 thereof are extended (or enlarged) is referred to as a first direction D1, a direction in which the mobile terminal 100 and the display 151 thereof are contracted (or retracted) or reduced is referred to as a second direction D2, and a direction vertical to the first and second directions D1 and D2 is referred to as a third direction.

The mobile terminal 100 of the present disclosure may switch from the first state in which the display 151 is located on the front side like a bar-type mobile terminal like FIG. 3(a) to the second state by extending the screen like FIG. 3(b). In the second state, a size of the display 151 located on the front side is enlarged and a size of the display 151 located on a backside is reduced like FIG. 4(b). Namely, the display 151 used to be located on the backside of the mobile terminal 100 in the first state is moved to the front side of the mobile terminal 100 in the second state.

Thus, in order for a position of the display to be variable, the display may employ a bendable, flexible display unit 151. A flexible display means a display that is light-weighted, easily-unbreakable and heavy-duty display fabricated on a thin and flexible substrate capable of curving, bending, folding, twisting and rolling-up like a paper by maintaining the properties of the existing flat panel display.

Moreover, an electronic paper employs a display technology provided with the features of the normal ink and may differ from the existing flat panel display in using reflective light. The electronic paper may change information by electrophoresis using twist balls or capsules.

In a state that the flexible display unit 151 is not deformed (e.g., a state having an infinite curvature radius: hereinafter a basic state), a display region of the flexible display unit 151 becomes a plane. In a state deformed from the basic state by an external force (e.g., a state having a finite curvature radius: hereinafter a deformed state), the display region may become a curved surface. As shown in the drawing, information displayed in the deformed state may become visual information outputted to the curved surface. Such visual information is implemented in a manner that light emittance of subpixels deployed in a matrix form is controlled independently. The subpixel means a minimum unit for implementing a single color.

The flexible display unit 151 may lie not in a flat state but in a curved state (e.g., a top-bottom or right-left curved state) from the basic state. In this case, if an external force is applied to the flexible display unit 151, the flexible display unit 151 may be deformed into a flat state (or a less-curved state) or a more-curved state.

Meanwhile, the flexible display unit 151 may implement a flexible touchscreen by being combined with a touch sensor. If a touch is applied to the flexible touchscreen, the controller 180 (see FIG. 1) may perform a control in response to such a touch input. The flexible touchscreen may be configured to sense a touch input in the deformed state as well as in the basic state.

The touch sensor senses a touch (or a touch input) applied to the touchscreen using at least one of various touch types such as a resistance layer type, an electrostatic capacitance type, an infrared type, an ultrasonic type, etc.

For example, a touch sensor may be configured to convert a pressure applied to a specific portion of a touchscreen or a variation of electrostatic capacitance generated from the specific portion into an electric input signal. A touch sensor may be configured to detect a position or size of the touch sensor touched by a touch target applying a touch to a touchscreen, a pressure of the touch, an electrostatic capacitance of the touch, etc.

The size changes of the display unit 151 on the front and rear sides of the mobile terminal according to the state switching (first or second state) of the flexible display unit 151, i.e., the size change of the mobile terminal 100 may be performed manually by a force applied by a user, which is non-limited by the manual way. For example, when the mobile terminal 100 or the flexible display unit 151 is in the first state, it may be deformed into the second state by a command of a user or application without an external force applied by the user. Thus, in order for the flexible display unit 151 to be automatically deformed without such an external force, the mobile terminal 100 may include a drive unit 200 described later.

The flexible display unit 151 of the present disclosure is rolled round a prescribed one of both side parts of the mobile terminal 100, thereby being folded at 180°. Hence, one portion of the display unit 151 is disposed on the front side of the mobile terminal 100 with reference to such a side part, while the rest is disposed on the backside of the mobile terminal 100. Some portion of the display unit 151 located on the front side of the mobile terminal 100 may be fixed to the front side not to move, while the rest of the display unit 151 located on the backside of the mobile terminal 100 may be provided to be movable on the backside. The display unit 151 may be rolled or unrolled round the side part, whereby a size of the region disposed on the front side of the mobile terminal 100 may be adjusted by moving a part of the display unit 151 disposed on the backside of the mobile terminal 100. Since a size of the flexible display unit 151 is determined and the flexible display unit 151 includes a single continuous body, if a size of the flexible display unit 151 located on the front side of the mobile terminal 100 is increased, a size of the flexible display unit 151 located on the backside of the mobile terminal 100 is decreased. The above-configured display unit 151 may be rolled within the second frame 102 relatively movable to the first frame 101, which will be described later, and more specifically, around a prescribed side part of the second frame 102, and withdrawn (or pulled out) from or inserted (or pushed) into the second frame 102 by being rolled around the second frame 102 along a moving direction of the second frame 102 to adjust the size of the display unit 151 on the front side of the mobile terminal 100. Such an operation will be described in detail together with other related components of the mobile terminal 100.

Typically, an antenna is provided to the case of housing of the mobile terminal 100. Yet, an antenna installed portion of the case or housing may be restricted by the flexible display unit 151 that covers the front side of the mobile terminal 100 up to the backside. For that reason, an antenna may be implemented on the flexible display unit 151. An Antenna On Display (AOD) includes an antenna configured in a manner of forming a transparent film with patterned electrode layers and dielectric layers laid one upon another. As the AOD can be implemented thinner than Laser Direct Structuring (LDS) with Cu—Ni plating, it barely affects thickness and does not come into view, advantageously. And, the AOD may directly transceive signals with the display unit 151. Therefore, the AOD is available for the mobile terminal 100 having the display unit 151 located on both sides thereof.

Specific configuration of the mobile terminal 100 of the present disclosure is described in detail with reference to FIGS. 2 to 5 as follows. In the following description, FIG. 2 showing the overall configuration is referred to basically and FIGS. 3 to 5 are referred to describe the specific features of the corresponding components in the first and second states of the mobile terminal 100.

The mobile terminal 100 of the present disclosure may include a first frame 101, a second frame 102 moving in a first direction against the first frame 101, and a third frame 103 moving in the first direction against the second frame 102. The first and second frames 101 and 102 include a front part, a rear part and a lateral part, which are coupled together. Therefore, the mobile terminal 100 may form a hexahedral exterior with the coupled first and second frames 101 and 102. Considering the configuration of the illustrated first to third frames 101 to 103, movement of the second and third frames 102 and 103 may become slide movement.

First of all, the first frame 101 corresponds to a main body of the mobile terminal 100 and may form a space inside to receive various parts therein. And, the first frame 101 may receive the second frame 102, which is movably coupled to the first frame 101, within such a space. Particularly, as shown in FIG. 2 and FIG. 5, the first frame 101 may include a first front part 1011 disposed on the front side of the mobile terminal 100 and first and second rear parts 1011 and 1012 disposed on the rear side of the mobile terminal 100. Each of the first front part 1011, the first rear part 1012 and the second rear part 1013 may include an approximately flat plate-type member. The first rear part 1012 and the second rear part 1013 may include separate members coupled together or a single member shown in the drawing. In order to form a prescribed space, the first font part 1011 and the first/second rear part 1012/1013 may be spaced apart from each other in a prescribed gap and connected to each other by a lateral part 1014. As parts of the mobile terminal 100, the controller 180 and the power supply unit 190 may be received in the space within the first frame 101. For example, the controller 180 may include a circuit board including a processor and electronic circuit for controlling operations of the mobile terminal 100 and the power supply unit 190 may include a battery and related parts. Moreover, the second frame 102 and the drive unit 200 described alter may be received in the first frame 101 as well.

As described above, the display unit 151 has the continuous body and may be disposed on both of the front and rear sides of the mobile terminal 100 by being rolled up within the mobile terminal 100. Hence, a portion of the display unit 151 may be disposed on the first front part 1011 corresponding to the front side of the mobile terminal 100 and the rest may be disposed on the first and second rear parts 1012 and 1013 corresponding to the rear side of the mobile terminal 100, simultaneously. On the other hand, as well shown in FIG. 4, for the installation of various physical input units 120 and sensor units 140 for manipulations of the mobile terminal 100, the display unit 151 may be disposed on the second rear part 1013 only. Since the first rear part 1012 is always exposed externally, the input unit 120 such as various buttons, switches, the camera 121 and a flash and the sensor unit 140 such as the proximity sensor 141 may be disposed on the first rear part 1012. A typical bar-type terminal includes a display unit provided to a front side of the terminal only. Hence, a camera is disposed on a backside of the terminal in order to capture an image by viewing a thing located at the opposite side of a user through a display unit. In order for the user to capture himself by viewing himself through the display unit, an additional camera needs to be provided to the front side of the terminal. Yet, according to the mobile terminal 100 of the present disclosure, the display unit 151 is located on both of the front and rear sides thereof. Therefore, when a user takes a selfie, the display unit located on the same side of the camera 121, i.e., a portion of the display unit 151 located on the backside of the mobile terminal 100 in the drawing may be used. When a thing at the opposite side of the user is captured, the display unit located on the opposite side of the camera 121, i.e., a portion of the display unit 151 on the front side of the mobile terminal 100 in the drawing may be used. For that reason, the mobile terminal 100 may capture a thing located at the opposite side of a user or a selfie using the single camera 121. The camera may include a plurality of cameras of different view angles such as a wide angle, a super wide angle, a telescope, etc. A proximity sensor, an audio output module and the like may be located on the first rear part 1012 as well as the camera, and an antenna 116 may be installed thereon.

The lateral part 1014 may be elongated along edges of the first front part 1011 and the first/second rear part 1012/1013 to enclose a circumference of the first frame 101 and form an exterior of the mobile terminal 100. Yet, as mentioned above, since the second frame 102 is received in the first frame 101 and movably coupled thereto, a portion of the first frame 101 needs to be open to allow the relative movement of the second frame 102 to the first frame 101. As well shown in FIG. 2, for example, since the second frame 102 is movably coupled to one of both side parts of the first frame 101, the lateral part 1014 is not formed at such a side part, thereby opening it. Hence, the first frame 101 may include a first side part 101a substantially closed and a second side part 101b disposed to oppose the first side part 101a so as to be open. Since the lateral part 1014 is exposed from the mobile terminal 100, the interface unit 160 for connecting to a power port or an earphone jack or the user input unit 120 such as a volume button and the like may be disposed thereon. In case of containing metal substance, the lateral part 1014 may play a role as an antenna.

Referring to FIG. 2, the second frame 102 may include a second front part 1021 disposed on the front side of the mobile terminal 100 and a third rear part 1022 disposed on the rear side of the mobile terminal 100. Like the first front part 1011, the first rear part 1012 and the second rear part 1013 of the first frame 101, each of the second front part 1021 and the third rear part 1022 may be formed of an approximately flat plate-type member. Moreover, the second frame 102 may receive various parts therein and should not interfere with the parts received in the first frame 101 while moving. Hence, the second front part 1021 and the third rear part 1022 may be coupled together in a manner of being spaced apart from each other and have a shape not interfering with the parts within the first frame 101.

Moreover, the display unit 151 may be folded at 180° while being rolled up within the second frame 102 so as to be disposed on both of the front and rear sides of the mobile terminal 100. For such arrangement of the display 151, the second frame 102 may include a roller 1028 rotatably disposed therein. The roller 1028 may be disposed at a random position within the second frame 102. Yet, the display 151 should be spread flat on the front and rear sides of the mobile terminal 100 to provide a user with a screen of a good quality. For such a spread, an appropriate tension should be provided to the display 151. In order to provide the appropriate tension, the roller 1028 may be preferably located distant from the first side part 101a of the first frame 101 adjacent to a side edge (or a side end) (i.e., a side end 151d in the drawing) of the display 151. As shown in FIG. 2, the second frame 102 includes two first and second side parts 102a and 102b confronting each other, and the first side part 102a may be located farther than the second side part 102b from the first frame, and more specifically, the first side part 101a of the first frame. For that reason, the roller 1028 may be disposed on the first side part 102a of the second frame 102 confronting the first side part 101a of the first frame 101. The roller 1028 may be elongated in a length direction of the mobile terminal 100, i.e., a length direction of the second frame 102, and coupled to the second frame 102, and more specifically, to top and bottom sides of the third rear part 1022. The display unit 151 may be rolled around the roller 1028 by being gradually curved with a prescribed curvature. Moreover, the roller 1028 may be installed to freely rotate on the second frame 102 by contacting with an inner surface of the display unit 151. Therefore, the roller 1028 is substantially capable of moving the display unit 151 in a direction vertical to a lateral direction, i.e., a length direction of the mobile terminal 100. As described later, when the second frame 102 is slid, the display unit 151 is moved by the tension applied by the second frame 102 to the front or rear side of the mobile terminal 100 relatively to the second frame 102 in a different direction (i.e., the first direction D1 or the second direction D2). In doing so, such a movement may be guided by the roller 1028 that is rotating.

Moreover, the roller 1028 is disposed on the first side part 102a of the second frame 102, and the first side part 102a substantially corresponds to a most outer side part of the mobile terminal 100. If the first side part 102a of the second frame 102 is exposed, the display unit 151 rolled around the roller 1028 may be broken or damaged. Hence, the second frame 102 may include a side frame 1024 disposed on the first side part 102a. The side frame 1024 may be elongated long in a length direction of the second frame 102 so as to cover the first side part 102a, thereby protecting the roller 1028 and the display unit 151 rolled around the roller 1028. By the side frame 1024, the second frame 102 may have the first side part 102a that is substantially closed. And, the side frame 1024 may substantially form an exterior of the mobile terminal 100 together with the lateral part 1014 of the first frame 101. Moreover, in order to minimize the interference with the parts within the frame 101 in the course of moving, the second frame 102 may include a second side part 102b disposed to confront the first side part 102a and configured open.

The above-configured second frame 102 is movably coupled to the first frame 101, thereby being configured to slide in a prescribed first or second direction D1 or D2 against the first frame 101. Specifically, as shown in the drawing, the second frame 102 may be movably coupled to the first frame 101 through the side part of the first frame 101, and more particularly, through the open second side part 101b. More specifically, the second side part 102b of the second frame 102 is disposed relatively adjacent to the closed first side part 101a of the first fame 101, whereby the first side part 102a of the second frame 102 may be disposed to control the first side part 101a. Therefore, the second side part 102b is inserted into the first frame 101 through the side part of the first frame 101, i.e., the second side part 10b thereof. The first side part 102b is not inserted into the first frame 101 but is always located outside the first frame 101, thereby forming the exterior of the mobile terminal 100 as described above. Yet, if necessary, the first side part 102b of the second frame 102 may be inserted into the first frame 101.

Owing to the above location relation, the second frame 102 may be enlarged or contracted from the first frame in a direction vertical to a length direction of the mobile terminal 100 or the first frame 101. Namely, each of the first and second directions D1 and D2 may be a direction vertical to a length direction of the mobile terminal 100 or the first frame 101 basically. On the other hand, each of the first and second directions D1 and D2 may be explained as a lateral or horizontal direction of the mobile terminal 100 or the first frame 101. Moreover, in the movement of the first direction D1, the second frame 102 is extended from the first frame 101, whereby the first direction D1 may become a direction that the second frame 102 gets away from the first frame 101, i.e., a direction the second frame 102 moves outwardly from the mobile terminal or the first frame 101. On the other hand, in the movement of the second direction D2, the second frame is contracted toward the first frame 101. Hence, the second direction D2 is a direction confronting the first direction D1 and may become a direction that the second frame 102 gets closer to the first frame 101, i.e., a direction that the second frame 102 moves inwardly into the mobile terminal 100 or the first frame 101. When moving in the first direction D1, the second frame 102 is extended and applies a force to a portion of the display unit 151 used to be disposed on the backside of the mobile terminal 100 so as to dispose it on the front side of the mobile terminal 100 additionally, thereby forming a region for such an additional disposition. Therefore, the second frame 102 may switch the mobile terminal 100 to the second state of having a relatively extended front display 151 by the movement in the first direction D1. On the other hand, when moving in the second direction D2, the second frame 102 is contracted into the original state and applies a force to a portion of the display unit 151 used to be disposed on the front side of the mobile terminal 100 so as to return it to the rear side of the mobile terminal 100. Therefore, by the movement in the second direction D2, the second frame 102 may switch the mobile terminal 100 to the first state of having a relatively reduced front display unit 151. Thus, the second frame 102 selectively exposes the display unit 151 on the front side of the mobile terminal 100 according to the moving direction (i.e., the first direction D1 or the second direction D2), thereby switching the mobile terminal 100 to the above-defined first or second state.

In the course of the above-mentioned extension and contraction in the first and second directions D1 and D2, the second frame 102 may overlap with the first frame 101, and more specifically, with the first front part 1011, the first rear part 1012 and the second rear part 1013 of the first frame 101 so as not to interfere with the first frame 101. Particularly, as described above, the display unit 151 may be coupled by the first front part 1011 of the first frame 101 and then supported by it, thereby being unnecessary to be additionally supported by the second front part 1021 of the second frame 102. Instead, if the second front part 1021 is inserted between the first front part 1011 and the display unit 151, the display unit 151 may be deformed or broken by the friction with the second front part 1021 that is moving repeatedly. Hence, as well shown in FIG. 5, the second front part 1021 may be disposed below the first front part 1011. Namely, a front side of the second front part 1021 may confront a backside of the first front part 1011. Moreover, in order to stably support the movement of the second frame 102, the backside of the first front part 1011 may contact with the front side of the second front part 1021. As described above, a portion of the display unit 151 is moved to the front side and the backside of the mobile terminal 100 according to the moving direction D1 or D2 of the second frame 102. Hence, in order for the display unit 151 to move smoothly, it may be advantageous that the display unit 151 is configured to move together with the second frame 102 instead of the first frame 101 that is stopped relatively. In order to move by linking to the second frame 102, the display unit 151 may need to be coupled to the second frame 102. Hence, the third rear part 1022 of the second frame 102 may be disposed below the second rear part 1013 of the first frame 101. Namely, a front side of the third rear part 1022 may confront the backside of the second rear part. In order to stably support the movement of the second frame 102, the backside of the second rear part 1013 may contact with the front side of the third rear part 1022. By such disposition, the third rear part 1022 may be exposed from the first frame 101, and more exactly, from the second rear part 1013 and coupled to the display unit 151.

The second frame 102 may extend or reduce a size of the mobile terminal 100 itself, and more particularly, the front side of the mobile terminal 100 by the extension and contraction in the first and second directions D1 and D2, and the display unit 151 should move by the extended or reduced front side to obtain the intended first or second state. Yet, if the second frame 102 is fixed, the display unit 151 is unable to smoothly move to keep up with the extended or reduced front side of the mobile terminal 100. For that reason, the display unit 151 may be movably coupled to the second frame 102. Particularly, the display unit 151 may include a first side end (or edge) 151d disposed on the front side of the mobile terminal 100 and a second side end (or edge) 151e provided to the rear side of the mobile terminal 100 by confronting the first side end. The first side end 151d is disposed on the front side of the first frame 101, i.e., the front side of the first front part 1011 of the first fame 101 in a manner of being adjacent to the side part of the mobile terminal 100, i.e., the first side part 101a of the first frame 101. On the contrary, as the second side end 151e is adjacent to the backside of the mobile terminal 100, i.e., the third rear part 1022 of the second frame 102, it may be coupled to the third rear part 1022 of the second frame 102 so as to be movable in the first and second directions D1 and D2. Moreover, since the display 151 is not strong structurally, the third frame 103 may be coupled to the second side end 151e. The third frame 103 may include a panel member elongated long in the length direction of the mobile terminal 100. Hence, the third frame 103 may be coupled to the second frame 102, i.e., the third rear part 1022 thereof instead of the second side end 151e so as to be movable in the first and second directions D1 and D2. The second frame 102 may include a slot 1025 elongated in a lateral direction of the mobile terminal 100 or the second frame 102, i.e., a direction vertical to the length direction thereof, and the third frame 103 may stably move by being guided by the slot 1025. The third frame 103 may include a protrusion inserted in the slot 1025 for example for the movement along the slot 1025.

Referring to FIGS. 3 to 5, in association with the above configurations of the first to third frames 103, the display unit 151 may include a first region 1511 elongated in a prescribed length from one side of the display unit 151, i.e., the first side end 151d toward the confronted second side end 151e and a second region 1512 disposed to confront the first region 1511 and elongated in a prescribed length from the second side end 151e toward the first side end 151d. And, the display unit 151 may include a third region 1513 disposed between the first region 1511 and the second region 1512. The first to third regions 1511 to 1513 are connected to one another and may form a continuous body of the display unit 151. As described above, for the movement to the front or rear side of the mobile terminal 100 of the third region 1513 according to the moving direction of the second frame 102, the first region 151 may be fixed to the front side of the mobile terminal 100 so as not to be movable and the second region 1512 may be movably provided to the rear side of the mobile terminal 100. Such a configuration of the display unit 151 is described in detail as follows.

The first region 1511 may be disposed on the front side of the mobile terminal 100, and more particularly, to the front side of the first front part 1011. The first region 1511 is fixed to the first frame 101, i.e., the front side of the first front part 1011 so as not to move in the course of the movement of the second frame 102, thereby being always exposed to the front side of the mobile terminal 100. The third region 1513 is adjacent to the first region 1511 and may be rolled around the roller 1028 by extending into the second frame 102. The third region 1513 may continuously extend out of the second frame 102 so as to cover the second frame 102, i.e., the backside of the third rear part 1022 in part. On the other hand, the second frame 102, i.e., the third rear part 1022 is adjacent to the first frame 101, i.e., the second rear part 1013 so as to form the rear case of the mobile terminal 100 together, whereby the third region 1513 may be described as disposed on the backside of the first frame 101 as well.

The second region 1512 is adjacent to the third region 1513 and may be disposed on the backside of the mobile terminal 100, and more particularly, to the second frame 102, i.e., the backside of the third rear part 1022 thereof. Namely, the second region 1512 may be coupled not to the second frame 102 directly but to the third frame 103. As shown in FIG. 4 (b), a slot 1025 extending in a lateral direction (i.e., a direction vertical to the length direction of the mobile terminal 100) is formed in the second frame 102, i.e., the third rear part 1022, and the third frame 103 may move along the slot 1025. Although FIG. 4 (b) shows that the slot 1025 is formed on the backside of the second frame 102, the slot 1025 may be formed on a lateral surface of the second frame 102. The second region 1512 may move in the first or second direction D1 or D2 against the second frame 102 together with the third frame 103, but the movement of the second region 1512 may be restricted within the backside of the mobile terminal 100 by the slot 1025. Namely, the second region 1512 does not move out of the second frame 102 despite that the second frame 102 is extended or contracted but may move within the second frame 102 along the slot 1025 by the extended or contracted distance. Therefore, the second region 1512 may be always exposed on the backside of the mobile terminal 100.

Eventually, as the first region 1511 may be disposed on the front side of the mobile terminal 100 so as to be always exposed on the front side irrespective of the movement of the second frame 102, and the second region 1512 may be disposed on the backside of the mobile terminal 100 so as to be always exposed on the backside irrespective of the movement of the second frame 102. The third region 1513 is disposed between the first and second regions 1511 and 1512, thereby being selectively disposed on the front side or backside of the mobile terminal 100 according to the moving direction D1/D2 of the second frame 102. According to the selective disposition of the third region 1513, as shown in FIG. 4 (b), the second rear part 1013 of the first frame 101 is covered by the second and third regions 1512 and 1513 of the display unit 151 and the third rear part 1022 in the first state. Yet, in the second state, as the third region 1513 is moved to the front side of the mobile terminal 100, the third rear part 1022 is moved in the first direction D1 as well, thereby being possibly exposed out of the mobile terminal 100. Moreover, the second front part 1021 of the second frame 102 is disposed below the first front part 1011 of the first frame 101 in the first state but may be moved out of the first frame 101 in the second state so as to support the third region 1513 of the display unit 151 disposed on the front side of the mobile terminal 100.

As the first region 1511 and the second region 1512 are always disposed on the front side and the backside of the mobile terminal 100, respectively, the curvatures of the first and second regions 1511 and 1512 may maintain the flat basic state without variation. Yet, the third region 1513 may be bent or folder by being rolled around the roller 1028 within the second frame 102. When the first state is switched to the second state, the third region 1513 may be enlarged to the front side of the mobile terminal 100 from the second frame 102 by being rolled around the roller 1028 in a prescribed direction. On the contrary, when the second state is switched to the first state, the third region 1513 may be contracted into the second frame 102 from the front side of the mobile terminal 100 by being rolled around the roller 1028 in a reverse direction and return to the backside of the mobile terminal 100 from the second frame 102 simultaneously. Since only a specific portion of a foldable mobile terminal unfolded like a book is folded repeatedly, the specific portion is vulnerable to breakage. On the other hand, a deformed portion of the flexible display unit 151, i.e., the portion rolled around the roller 1028 is variable according to the first or second state of the mobile terminal 100, i.e., the movement of the second frame 102. Therefore, the mobile terminal 100 of the present disclosure may considerably reduce the deformation and fatigue applied repeatedly to the specific portion of the display unit 151, thereby preventing the breakage or damage of the display unit 151.

Based on the aforementioned configuration, the overall operation of the mobile terminal 100 is described as follows. For example, a state switching may be performed manually by a user, and an operation of the mobile terminal 100 during the manual state switching is described. Yet, operations of the first to third frames 101 to 103 and the display unit 151 may be identically performed in case of using a power source other than a user's force, i.e., in case of applying the drive unit 200 described later.

As shown in FIG. 3 (a), FIG. 4 (a) and FIG. 5 (a), in the first state, the second frame 102 is fully contracted or retracted into the first frame 101. Therefore, only the first region 1511 of the display unit 151 fixed to the front side of the first frame 101 may be exposed on the front side of the mobile terminal 100. The first region 1511 may be fixed to and supported by the first frame 101, i.e., the first front part 1011 thereof. The third region 1513 may be disposed on the backside of the mobile terminal 100 together with the second region 1512 mostly and disposed within the second frame 102 in a state of being rolled around the roller 1028 in part. The third region 1513 of the backside of the mobile terminal 100 may be supported by the second frame, i.e., the third rear part 1022 1022 thereof. The second region 1512 may be fixed by the third frame 103 disposed on the second frame 1022 (i.e., the third rear part 1022) and movably coupled to the second frame 102.

In such a first state, if the second frame 102 is moved in the first direction D1, the mobile terminal 100 may switch to the second state. As shown in FIG. 3 (b), FIG. 4 (b) and FIG. 5 (b), the second frame 102 is extended from the first frame 101 by the movement in the first direction D1 and may increase an overall size of the mobile terminal 100, and more particularly, the front side thereof. During the movement in the first direction D1, the second frame 102 may apply a force, i.e., tension to the display unit 151 in the first direction D1. As the display unit 151 is fixed to the first frame 101 but movably coupled to the second frame 102 using the third frame 103, the third region 1513 may be rolled out of the roller 1028 of the second frame 102 to the front side of the mobile terminal 100 by the force applied by the second fame 102. Namely, the third region 1513 may be withdrawn (or pulled out), extend or move out from the second frame 102. Simultaneously, a portion disposed on the third region 1513, and more particularly, on the backside of the mobile terminal 100 may be rolled into the roller 1028 of the second frame 102 or inserted (or pushed), retracted or moved in the second frame 102. The third region 1513 is not fully withdrawn from the second frame 102 to the front side of the mobile terminal 100, and a portion of the third region 1513 may be disposed in the second frame 102 in a state of being still rolled around the roller 1028. Moreover, for such a smooth movement of the third region 1513, the second region 1512 may move in the first direction D1 against the second frame 102 together with the third frame 103. Moreover, as described above, the second region 1512 and the third frame 103 may relatively move in the first direction D1 against the first frame 101 together with the second frame 102 by being restrained by the second frame 102. Therefore, the second region 1512 and the third frame 103 may move relatively in the first direction D1 not only for the second frame 102 but also for the first frame 101, thereby being capable of moving a distance longer than a moving distance of the second frame 102. Therefore, for the long movement of the second region 1512 in the first direction D1, the third region 1513 may be smoothly extended to the front side of the mobile terminal 100. For the movement of the third region 1513 in proportion to the extension of the second frame 102, the movement of the second region 1512 and the third frame 103 in the first direction D1 may be performed simultaneously with the movement of the third region 1512 and the second frame 102 in the first direction D1 so as to be proportional to the movement of the third region 1513 and the second frame 102.

Once the second frame 102 is fully extended in the first direction D1, the first and third regions 1511 and 1513 are disposed on the front side of the mobile terminal 100 and only the second region 1512 may be disposed on the backside of the mobile terminal 100. The first and third regions 1511 and 1513 may be supported by the first frame (i.e., the first front part 1011 thereof) and the second frame (i.e., the second front part 1021 thereof). As the second frame 102, i.e., the third rear part 1033 thereof is extended in the first direction D1, they may expose the second rear part 1013 of the first frame 101 support the moving third region 1513. Therefore, in the second state, the mobile terminal 100 may have the enlarged front display unit 151.

On the other hand, if the second frame 102 is moved in the second direction D2 in the second state, the mobile terminal 100 may return to the first state as shown in FIG. 3 (a), FIG. 4 (a) and FIG. 5 (a). The second frame 102 is retracted into the first frame 101 by the movement in the second direction D2, thereby reducing the overall size of the mobile terminal 100, and particularly, the front side thereof. The movement of the display unit 151 during the movement of the second frame 102 may be performed in reverse order of the aforementioned movement in the first direction D1. Schematically, the third region 1513 may be rolled into the roller 1028 of the second frame 102 from the front side of the mobile terminal 100 or inserted/retracted/moved in the second frame 102. Simultaneously, the third region 1513 may be rolled out of the roller 1028 of the second frame 102 or withdrawn/extended/moved out of the roller 1028 of the second frame 102 to the backside of the mobile terminal 100. The third region 1513 is not fully withdrawn from the second frame 102 to the backside of the mobile terminal 100, and a portion of the third region 1513 may be disposed in the second frame 102 in a state of being still rolled around the roller 1028. Moreover, for such a smooth movement of the third region 1513, the second region 1512 may move in the second direction D2 against the second frame 102 together with the third frame 103, and the second region 1512 and the third frame 103 may relatively move in the second direction D2 against the first frame 101 together with the second frame 102 by being restrained by the second frame 102. Therefore, the second region 1512 and the third frame 103 may move relatively in the second direction D2 not only for the second frame 102 but also for the first frame 101, thereby being capable of moving a distance longer than a moving distance of the second frame 102. For the long movement of the second region 1512, the third region 1513 may smoothly return to the backside of the mobile terminal 100.

Moreover, for the movement of the third region 1513 in proportion to the retraction of the second frame 102, the movement of the second region 1512 and the third frame 103 in the second direction D2 may be performed simultaneously with the movement of the third region 1512 and the second frame 102 in the second direction D2 so as to be proportional to the movement of the third region 1513 and the second frame 102. If the second frame 102 is fully retracted in the second direction D2, the mobile terminal 100 may switch to the first state mentioned in the foregoing description and have the front display unit 151, which is relatively reduced smaller than that the second state, in the first state.

Figure 6:
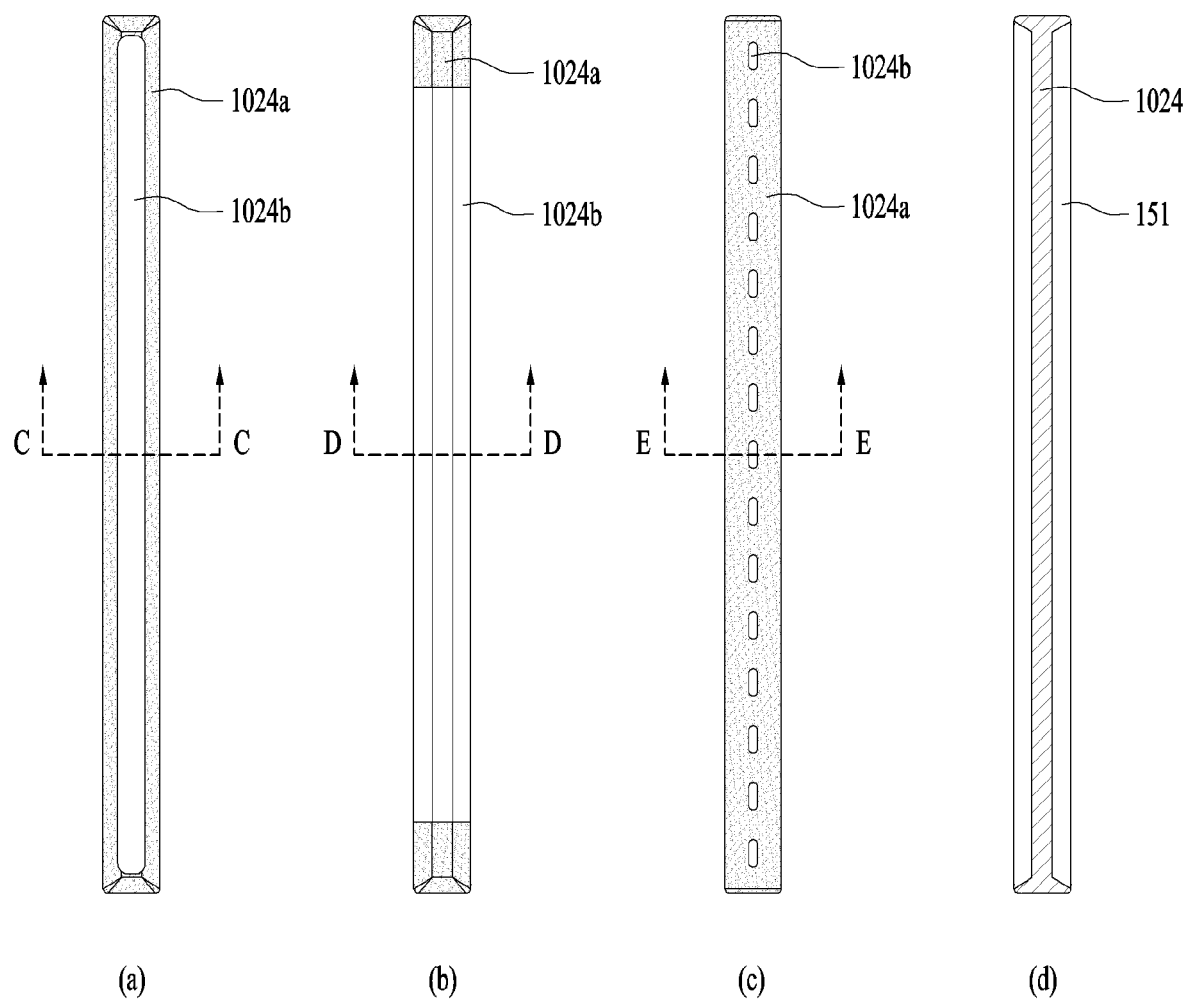
FIG. 6 is a view showing various embodiments of a side frame of a mobile terminal.
Figure 7:
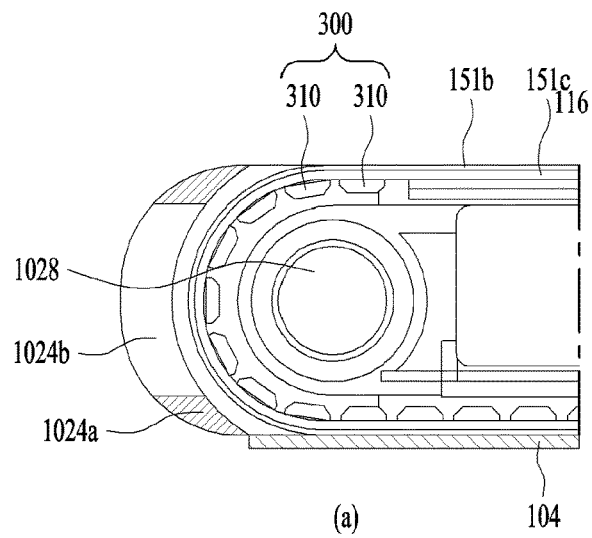
FIG. 7 is a cross-sectional view showing side frames obtained along the cutting lines C-C, D-D and E-E of FIG. 6, respectively.
Figure 7:
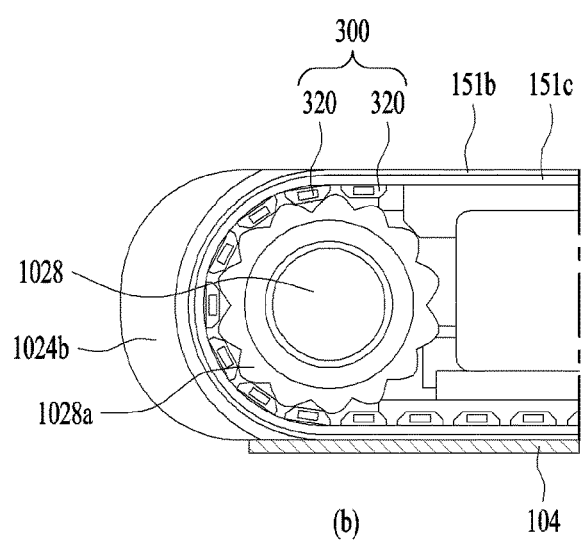
Figure 7:
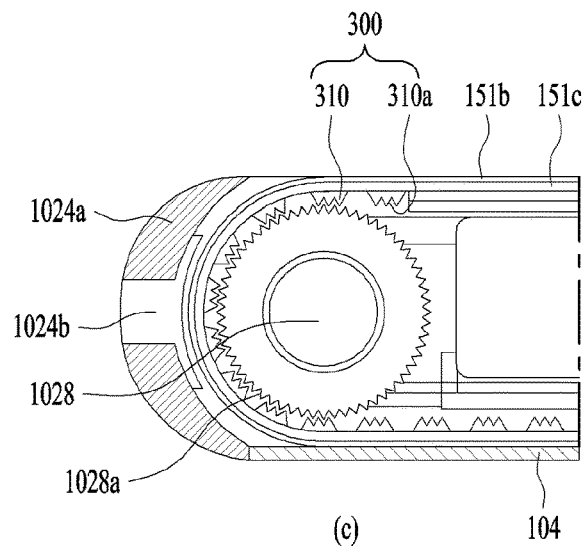

Meanwhile, in the mobile terminal 100 according to the preset disclosure, the side frame 1024 may have various configurations to perform various functions. FIG. 6 is a view showing various embodiments of a side frame of a mobile terminal, and FIG. 7 is a cross-sectional view showing side frames and adjacent components, obtained along the cutting lines C-C, D-D and E-E of FIG. 6, respectively. The side frame 1024 and the components adjacent thereto are described in detail with reference to the accompanying drawings as follows.

First of all, the side frame 1024 may include a non-transparent or transparent material or be configured in a manner of mixing a non-transparent and a transparent material together. As shown in FIG. 6 (a), the side frame 1024 includes a transparent part 1024b in the middle of a non-transparent part 1024a, thereby forming a window through which the display unit 151 rolled around the roller 1038 1038 is exposed. As shown in FIG. 6 (b), the side frame 1024 has a further enlarged region of a transparent part 1024b, thereby enlarging the exposed display unit 151. Through the transparent part 1024b, an image or text outputted from the flexible display unit 151 is viewable.

A user input may be performed on a lateral side using a touch sensor of the flexible display unit 151. For a touch input, the side frame 1024 may include a conductive material. By forming a protrusion at a conductive material contained portion, a user may touch the protrusion to input a user command.

An inner side of the side frame 1024 corresponding to a curvature of the flexible display unit 151 rolled around the roller 1028 is formed to have a thicker middle portion, thereby securing rigidity with a natural curved surface.

As shown in FIG. 6 (c), a transparent part 1024b of a prescribed pattern is configured, thereby providing a user with notification by driving the flexible display unit 151. For example, if there is an incoming call, the flexible display unit 151 may be driven to emit light sequentially.

If there is a notification push of a message or application, notification may be provided in a manner of projecting a light in specific color from the flexible display unit 151 rolled around the roller 1028. Therefore, notification may be provided to a user using the flexible display unit 151 without the separate optical output unit 154. In this case, the transparent part 1024b may obtain an effect of spreading light delicately using a semi-transparent material instead of a fully-transparent material.

As shown in FIG. 6 (d), a terminal may be implemented in a manner that a thickness-directional width of a region of a side frame 1024 is narrowed to provide an edge region extended to a prescribed region in a lateral direction to an end of the display unit 151.

The side frame 1024 prevents a breakage problem caused when a face of the flexible display unit 151 folded by an out-folding scheme is exposed externally, whereby durability of the mobile terminal 100 may be enhanced.

FIG. 7 shows configurations of the roller 1028 and the flexible display unit 151 as well as the side frame 1024. The flexible display unit 151 of the preset disclosure may include a display panel 151b outputting a video and a back plate 151c supporting a backside of the display panel 151b.

The display panel 151b is a flexible video display device and may include an Organic Light Emitting Diode (OLED). The back plate 151c may use a metal plate provided to the backside of the display panel 151 with rigidity to support the display panel 151b. If the display panel 151b is bent, the metal plate may be bent together with the display panel 151b.

The back plate 151c and the display panel 151b may be attached to each other using an adhesive member. And, the adhesive member may use a double-sided tape such as OCA flexible within a prescribed range like a foam material. Hence, the adhesive member can offset the slip effect due to a curvature radius difference between the back plate 151c and the display panel 151b.

In order to achieve the natural folding when the third region 1513 is deformed, a groove elongated in the third direction, i.e., the length direction of the mobile terminal 100 may be formed on a surface of a region of the back plate 151c corresponding to the third region 1513. Namely, such a groove may be elongated in a straight line between top and bottom ends of the back plate 151c.

Although the back plate 151c has the rigidity, it is unable to completely prevent the droop of the display unit 151. Hence, the display unit 151 may further include a support frame 300 located on a region corresponding to the third region 1513 thereof.

The support frame 300 may include a plurality of support bars 310 elongated in the third direction, i.e., the length direction of the mobile terminal 100. The support bar 310 may be continuously elongated between the top and bottom ends of the display unit 151. The support bars 310 may be spaced apart from each other in a prescribed distance along the length direction of the display unit 151. As the support bars 310 are not formed wide, they may support the backside of the flexible display unit 151 without interrupting the bending deformation of the flexible display unit 151. Particularly, in order to avoid the interference between the support bars 310 in case of folding the display unit 151, each of the support bars 310 may have a trapezoidal or trigonal cross-section so that a size of a portion attached to the back plate 151c is smaller than that of an opposite side.

The support bar 310 may be formed by plastic injection molding. If necessary, as shown in FIG. 7 (b), the rigidity of the support frame 300 may be reinforced by embedding a rigid bar 320 of a metal material in the support bar 310.

The thickness of the support frame 300 may be formed to correspond to that of the first front part 1011 of the first frame 101. As shown in FIG. 5 (b), the second front part 1021 used to be located inside the first front part 1011 in the first state is located on the backside of the third region 1513 of the flexible display unit 151 in the second state. Since a separation space amounting to the thickness of the first front part 1011 is formed between the second front part 1021 and the display unit 151, i.e., the back plate 151c, it causes a problem that the third region 1513 of the flexible display unit 151 droops.

The support frame 300 fills the separation space between the second front part 1021 and the display unit 151, i.e., the back plate 151c and supports the third region 1513 of the flexible display unit 151. Preferably, the thickness of the support frame 230 may have the thickness corresponding to the separation space between the second front part 1021 and the back plate 151c, i.e., the thickness of the first front part 1011. Moreover, as shown in FIG. 5 (a), a separation due to the thickness of the third frame 103 may be generated between the second frame, i.e., the third rear part 1022 thereof and the display unit 151. The support frame 300 may fill such separation as well, thereby supporting the third region 1513 more stably. To perform such a function, as described above, the support frame may be provided to the third region 1513, and more particularly, to the backside of the third region 1513 only.

In case that the support frame 300 has sufficient rigidity, the second front part 1021 of the second frame 102 may be skipped. In this case, the corresponding thickness may be set irrespective of the first front part 1011 of the first frame 101.

The roller 1028 may have various structures to enable the flexible display unit 151 to be rolled around the roller 1028 by contacting with a surface of the support frame 200 without being moved back. For example, as shown in FIG. 7 (b), the roller 1028 may include a gear disposed on a circumferential surface thereof and engaged between the support bars 310. On the other hand, as shown in FIG. 7 (c), a first sawtooth may be formed on a surface of the roller 1028 and a second sawtooth 310a engaging with the first sawtooth 1028a may be formed on a surface of the support frame 300 as well.

As shown in FIGS. 7 (a) to 7 (c), a rear cover 104 covering the backside of the mobile terminal 100 may be further included. As at least one portion of the rear cover 104 is transparent, a video outputted from the flexible display unit 151 located on the rear side can be checked. A portion of the rear cover 104 covering the first rear part 1012 may be formed transparent to correspond to the camera 121, the flash and the like at least.

The rear cover 104 may be coupled to the first frame 101 and cover it substantially by being directly coupled on the first rear part 1012. The rear cover 104 may not be coupled to the third rear part 1022 of the second frame 102, the third frame 103 and the flexible display unit 151 but may simply cover them. To this end, the rear cover 104 may be spaced apart from the second rear part 1013 by the total thickness of the third rear part 1022 of the second frame 102, the third frame 103 and the flexible display unit 151. In order not to interrupt the movement of the flexible display unit 151 and to prevent the breakage of the display unit 151, the rear cover 104 may be configured not to contact with the display unit 151. If the mobile terminal 100 is in the first state, the rear cover 104 may cover the flexible display unit 151. If the mobile terminal 100 is in the second state, the rear cover 104 may cover and protect the second rear part 1013 exposed by the movement of the flexible display unit 151 and the third rear part 1022.

The rear cover 104 may be coupled to the second frame 102. In this case, in the first state, the rear cover 104 may cover the entire backside of the mobile terminal 100, i.e., the first rear part 1012 and the display unit 151. In the second state, the rear cover 104 moves together with the second frame 102 and may cover the third rear part 1022 of the second frame 102 exposed by the movement of the display unit 151 and the second region 1512 of the flexible display unit 151 coupled to the third frame 103.

Meanwhile, when the flexible display unit 151 is enlarged in a manner that a user manually moves the second frame 102, the flexible display unit 151 may be twisted or the first or second frame 101 or 102 may be broken or damaged due to a force applied non-uniformly. Therefore, the mobile terminal 100 of the present disclosure may include a drive unit 200 configured to uniformly apply a force to the second frame 102 for movement. The drive unit 200 may move the second frame 102 in a manner of applying a force to the second frame 102 automatically according to a user's instruction or a prescribed condition.

Figure 8:
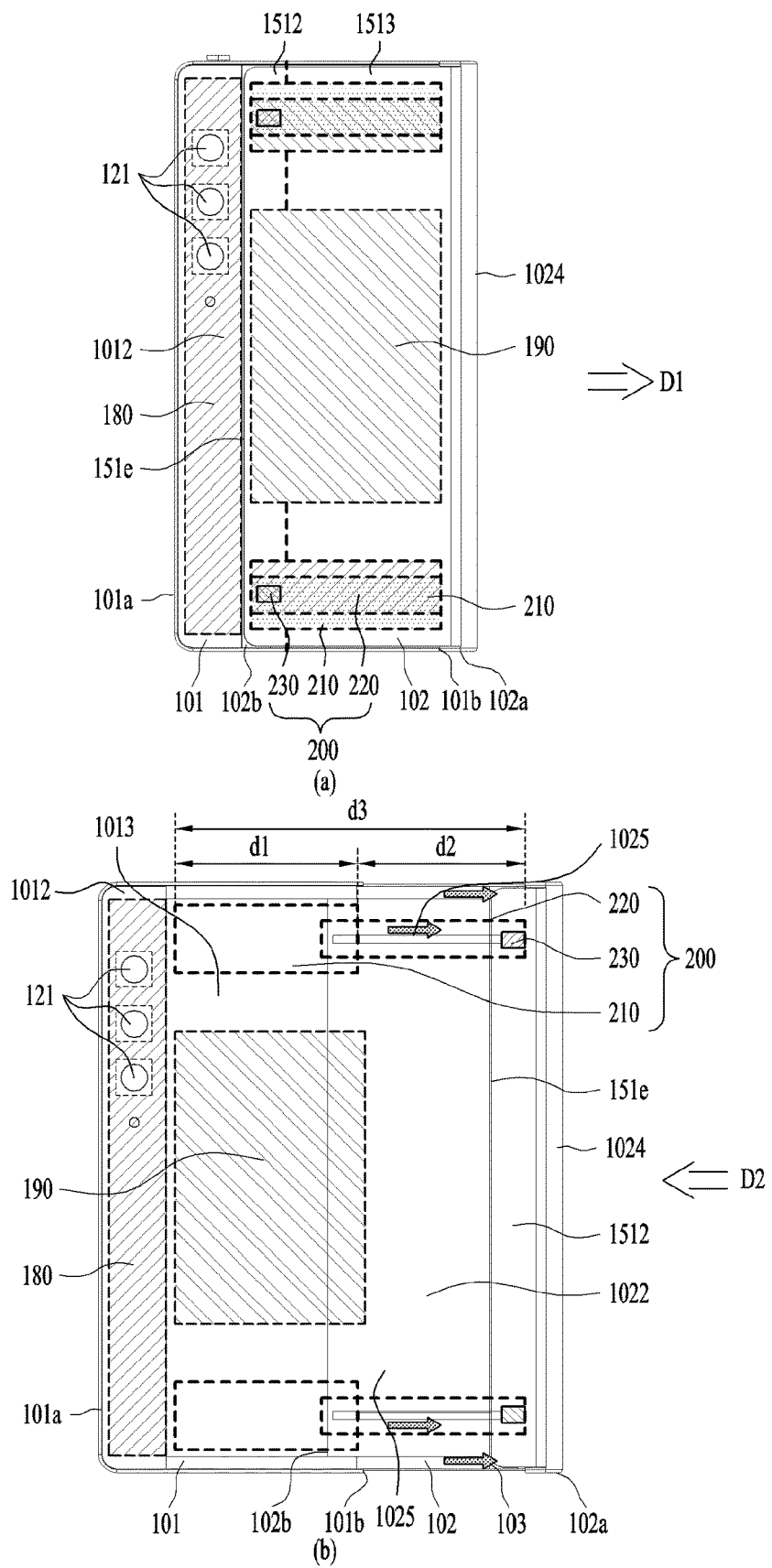
FIG. 8 is a backside view showing an operation of a drive unit and first and second states of a mobile terminal implemented by the operation.

The drive unit 200 is described in detail with reference to the relevant drawing as follows. FIG. 8 is a backside view showing an operation of a drive unit and first and second states of a mobile terminal implemented by the operation. An operation principle of the drive unit 200 is described first with reference to FIG. 8.

The drive unit 200 may be configured to move the second frame 102 relatively to the first frame 101 or move the third frame 103 relatively to the second frame 102. In particular, the drive unit 200 may move the second frame 102 in the first direction D1 against the first frame 101 and move the third frame 103 in the first direction D1 against the second frame 102. By the movement in the first direction D1, as described above, the mobile terminal 100 is switched to the second state from the first state. And, by the movement of the display unit 151 to the front side of the mobile terminal 100, the mobile terminal 100 may secure an enlarged front display region. Alternatively, the drive unit 200 may move the second frame 102 in the second direction D2 opposite to the first direction D1 against the first frame and move the third frame 103 in the same second direction D2. By the movement in the second direction D2, as described above, the mobile terminal 100 is switched to the first state from the second state. And, by the movement of the display unit 151 to the backside of the mobile terminal 100, the mobile terminal 100 may return to have a reduced front display region. Besides such basic movements, the drive unit 200 may be configured to perform all movements of the second and third frames 102 and 103 and the display unit 151 linked to them, which are required for the aforementioned state switching of the mobile terminal 100.

As schematically shown in FIG. 8, in order for the mobile terminal 100 to enter the second state, the second frame 102 may be moved in the first direction D1 by a first distance d1 preset for the first frame 101. Since the third frame 103, i.e., the second region 1512 is coupled to the second frame 102, it may basically move in the first direction D1 by the first distance d1 against the first frame 101 together with the second frame 102. By such a movement of the second frame 102, the front side of the mobile terminal 100 may be extended in the first direction D1 by a second distance d2 equal to the first distance d1. Hence, in order to move the display unit 151, and particularly, the third region 1513 to the front side of the mobile terminal 100 by the extended second distance d2, as shown in the drawing, the third frame 103 should further move in the first direction D1 against the second frame by the second distance d2 equal to the first distance d1 additionally. Hence, the display unit 151, i.e., the third frame 103 may move in the first direction D1 by a third distance d3 amounting to a double of the first distance d1 that is the moving distance of the second frame 102. On the other hand, in order to make the mobile terminal 100 to return to the first state, the second and third frames 102 and 103 may move in a manner opposite to the former description. Schematically, the second frame 102 moves in the second direction D2 against the first frame 101 by the first distance d1, and the third frame 103 may move in the second direction D2 against the second frame 102 by the second distance d2 in addition to the movement by the first distance d1 against the first frame 101. Hence, for the switching to the first state, the display unit 151, i.e., the third frame 103 may move in the second direction D1 by the third distance d3 amounting to the double of the first distance d1 that is the moving distance of the second frame 102. For that reason, the drive unit 200 may be configured to move the third frame 103 against the first frame 101 as well as the second frame 102, thereby moving the third frame 103 by the aforementioned long distance, i.e., the third distance d3.

While the front side of the mobile terminal 100 is increased or decreased by the movement of the second frame 102, if the display unit 151 fails to move in proportion to such increase or decrease of the front side, the enlargement or reduction of the display unit 151 on the front side of the mobile terminal 100 may not be smoothly performed. For that reason, the drive unit 200 may be configured to synchronize the movement, i.e., slide of the third frame 103 with the movement, i.e., slide of the second frame 102. Particularly, the drive unit 200 may be configured to synchronize a timing of starting the movement of the third frame 103 with a timing of starting the movement of the second frame 102. Namely, the drive unit 200 may be configured to make the third and second frames 103 and 102 start to move simultaneously. The simultaneous movements of the second and third frames 102 and 103 may start at the same location on the mobile terminal 100. Namely, the drive unit 200 may synchronize a location of starting the movement of the third frame 103 with a location of starting the movement of the second frame 102. Together with the synchronizations of the movement start timing and the movement start locations, the drive unit 200 may be configured to synchronize a moving speed of the third frame 103 with a moving speed of the second frame 102. Hence, the drive unit 200 may simultaneously move the second and third frames 102 and 103 from the same location within the same time by the same distance (i.e., the first distance d1 against the first frame 101 in case of the second frame 102, the second distance d2 against the first frame 102 in case of the third frame 103) against the first and second frames 101 and 102, respectively. Moreover, since the third frame 103 basically moves by the first distance d1 by being carried by the second frame 102, it may move long owing to the above-synchronized movement by the third distance d3 amounting to the sum of the first and second distances d1 and d2 overall by moving in proportion to the moving distance of the second frame 102. For that reason, by the drive unit 200, according to the increase/decrease of the front side of the mobile terminal 100, the display unit 151 may be smoothly enlarged/reduced on the front side.

The drive unit 200 is configured to satisfy such requirements. As schematically shown in FIG. 8. The drive unit 200 may include a supporter 210, a first actuator 220 movably coupled to the supporter 210, and a second actuator 230 movably coupled to the first actuator 220. The first actuator 220 reciprocates on a straight line in prescribed directions, i.e., the first and second directions D1 and D2 against the supporter 210 and may be configured to move the second frame 102. And, the second actuator 230 reciprocates on a straight line in the first and second directions Da and D2 against the first actuator 220 and may be configured to move the third frame 103. Namely, the drive unit 200 has the telescopic structure that includes the straight-lined reciprocating first and second actuators 220 and 230 as stages. Through the telescopic structure, the drive unit 200 may be configured to achieve the required moving distances of the second and third frames 102 and 103. Moreover, the drive unit 200 may be configured to synchronize the movement of the first actuator 220 and the movement of the second actuator 230 together for the synchronization of the movements of the second and third frames 102 and 103. The first and second actuators 220 and 230 of the drive unit 200 provide power to the frames 102 and 103 by linking to the second and third frames 102 and 103 and may perform the movements required for the frames 102 and 103 identically for the aforementioned state switching of the mobile terminal 100. The supporter 210 and the first and second actuators 220 and 230 of the above-configured drive unit 200 may have various configurations for the aforementioned intentional functions. In addition, the drive unit 200 may have configurations different from the supporter 210 and the first and second actuators 220 and 230 to perform the aforementioned functions.

In some implementations, as described above, the mobile terminal 100 may move the display 151 relatively to the related frames using the drive unit 200 that generates a drive force automatically. Hence, the mobile terminal 100 may be configured to adjust a size of the display 151 disposed on a front side of the mobile terminal 100, i.e., a size of a screen on a front side of the mobile terminal 100 implemented by such a display 151 and switch states (i.e., first state and second state) of the mobile terminal 100. Yet, as described above, since such a drive unit 200 use electromechanical mechanism that includes various components for an autonomous operation and self-generation of a drive force, it may malfunction or fail to perform a normal operation unintentionally. Therefore, for the stability of operations, the mobile terminal 100 may include an additional drive unit 400 to 800 configured to be manually operable.

As described later, the additional drive unit 400 to 800 may be basically configured to move frames 101 to 103 and relevant components or guide movements of them using a force given to the mobile terminal 100 by a user instead of a separate power source. As the additional drive unit 400 to 800 may be configured to self-generate a drive force and move the frames 101 to 103 and the relevant components or assist their movements using such a drive force. Owing to such configurations, the additional drive unit 400 to 800 may play a role in assisting the drive unit 200 in operating the mobile terminal 100 and significantly increase reliability and stability of the mobile terminal 100. Alternatively, the additional drive unit 400 to 800 may be directly driven by a user's force given to the mobile terminal 100, thereby independently operating the mobile terminal 100 instead of the drive unit 200. Hence, the mobile terminal 100 may include both of the drive unit 200 and the additional drive unit 400 to 800 or may include either the drive unit 200 or the additional drive unit 400 to 800. Considering the aforementioned mutual relation, the drive unit 200 may be referred to as an automatic drive unit, a first drive unit, or a primary drive unit. On the other hand, the additional drive unit 400 to 800 may be referred to as a manual drive unit, a second drive unit, or a secondary drive unit. And, components of the additional drive unit 400 to 800 corresponding to components of the drive unit 200 may be referred to in the same manner. Yet, for brevity of the following description, the additional drive unit 400 to 800 is simply described as 'drive unit'. Likewise, the components of the additional drive unit 400 to 800 corresponding to the components of the drive unit 200 may be referred to as the same names of the components of the drive unit 200. Therefore, the additional drive unit 400 to 800 and the components thereof may be changed into other names according to the aforementioned way despite the absence of explicit description, which is obvious to those skilled in the art. Moreover, the drive unit 200 and the additional drive unit 400 to 800 are distinguished from each other in the power type only and configured to perform the same operation of the mobile terminal 100. Therefore, the operations of the mobile terminal 100, i.e., the frames 101 to 103 of the mobile terminal 100 and the relevant components, which are described with reference to FIG. 5 and FIG. 8, are exactly applied to the operations of the mobile terminal 100 attributed to the additional drive unit 400 to 800 unless there are other explanations, of which detailed description will be omitted.

Figure 9:
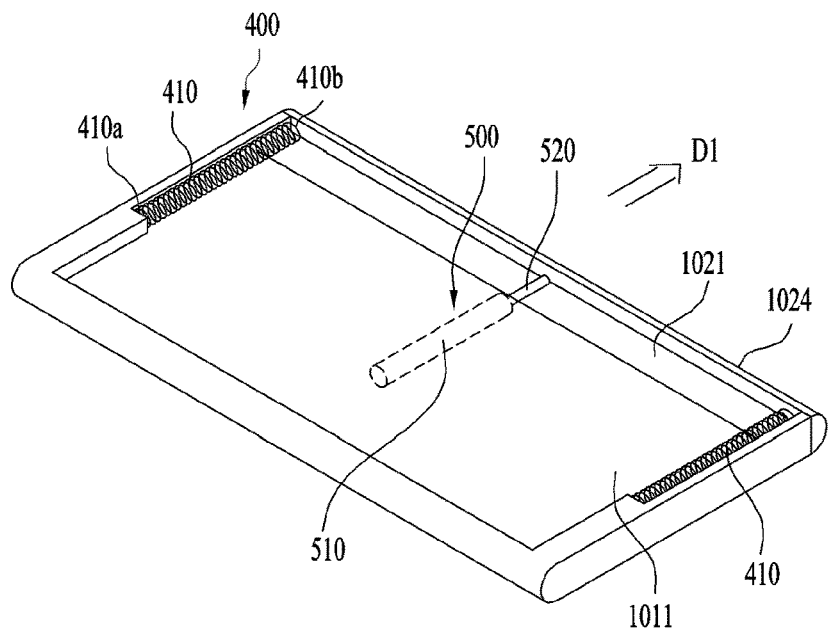
FIG. 9 is a partially-cut perspective diagram showing a mobile terminal and an actuator and damper of a manual drive unit provided to the mobile terminal.
Figure 9:
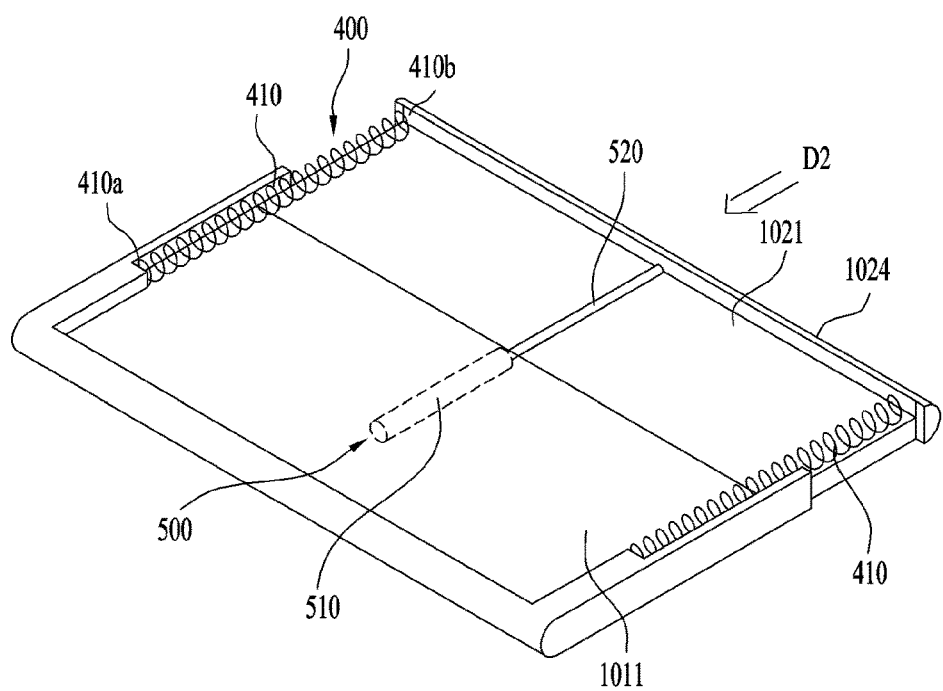
Figure 10:
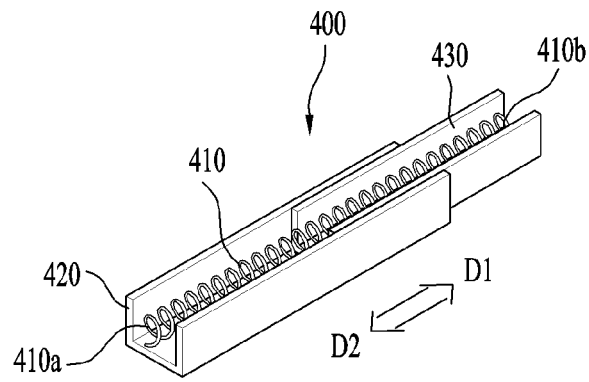
FIG. 10 is a partial perspective diagram showing the actuator of FIG. 9 in detail.
Figure 11:
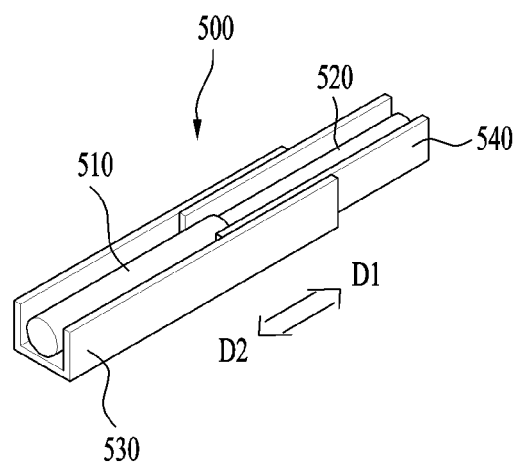
FIG. 11 is a partial perspective diagram showing the damper of FIG. 9 in detail.
Figure 12:
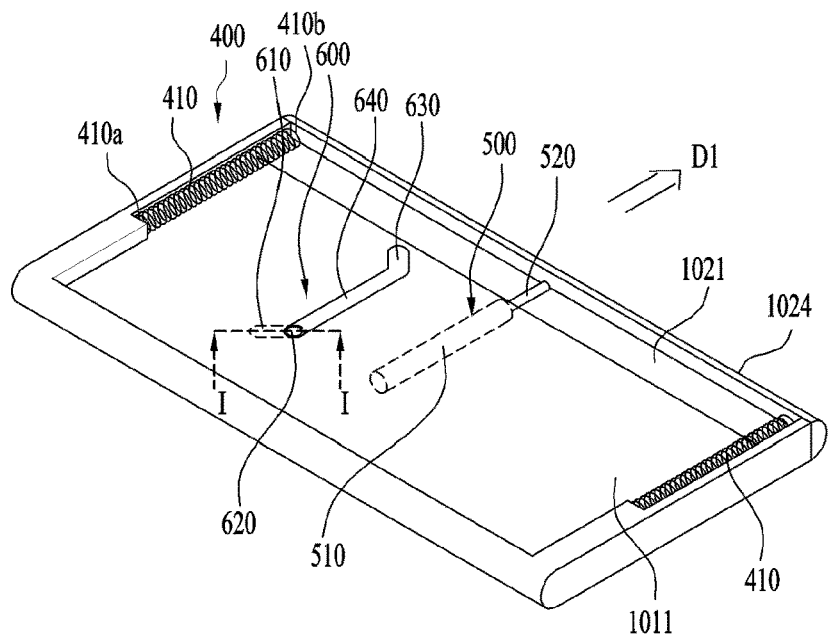
FIG. 12 is a partially-cut perspective diagram showing a locker of a manual drive unit provided within a mobile terminal.
Figure 12:
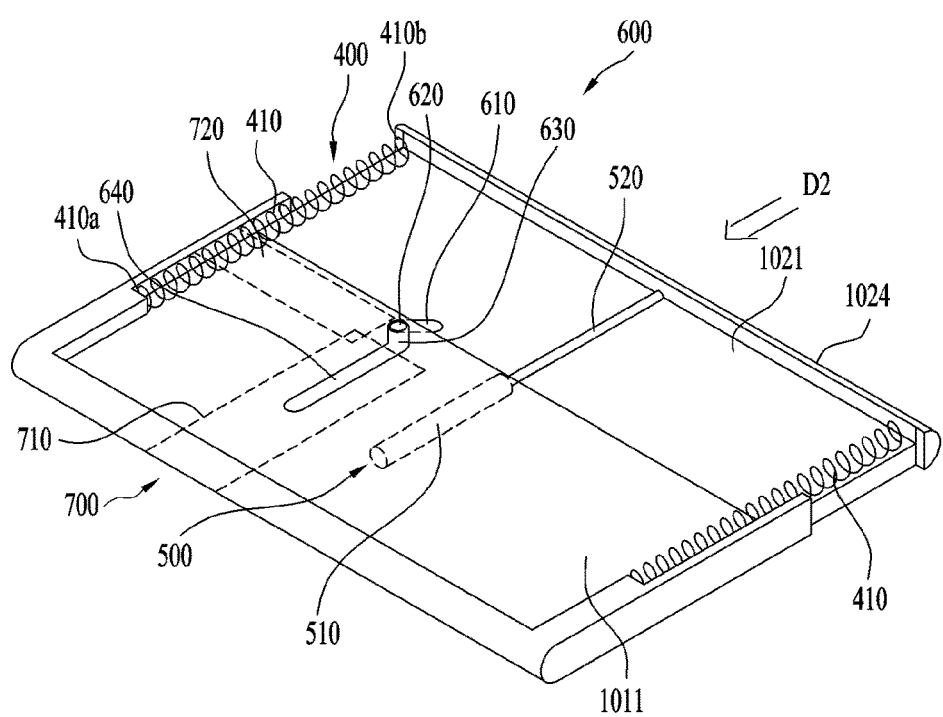
Figure 13:
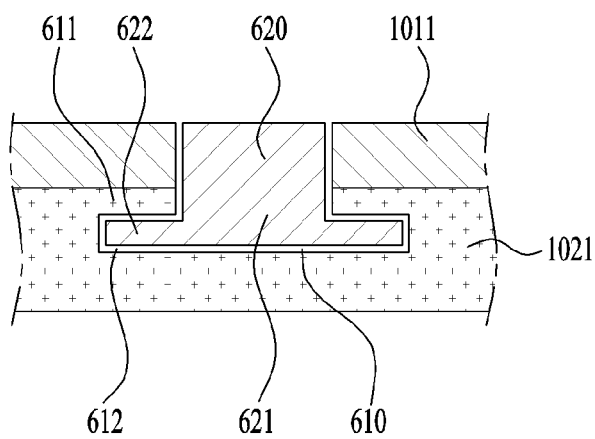
FIG. 13 is a cross-sectional diagram obtained along a cutting line I-I of FIG. 12.
Figure 14:
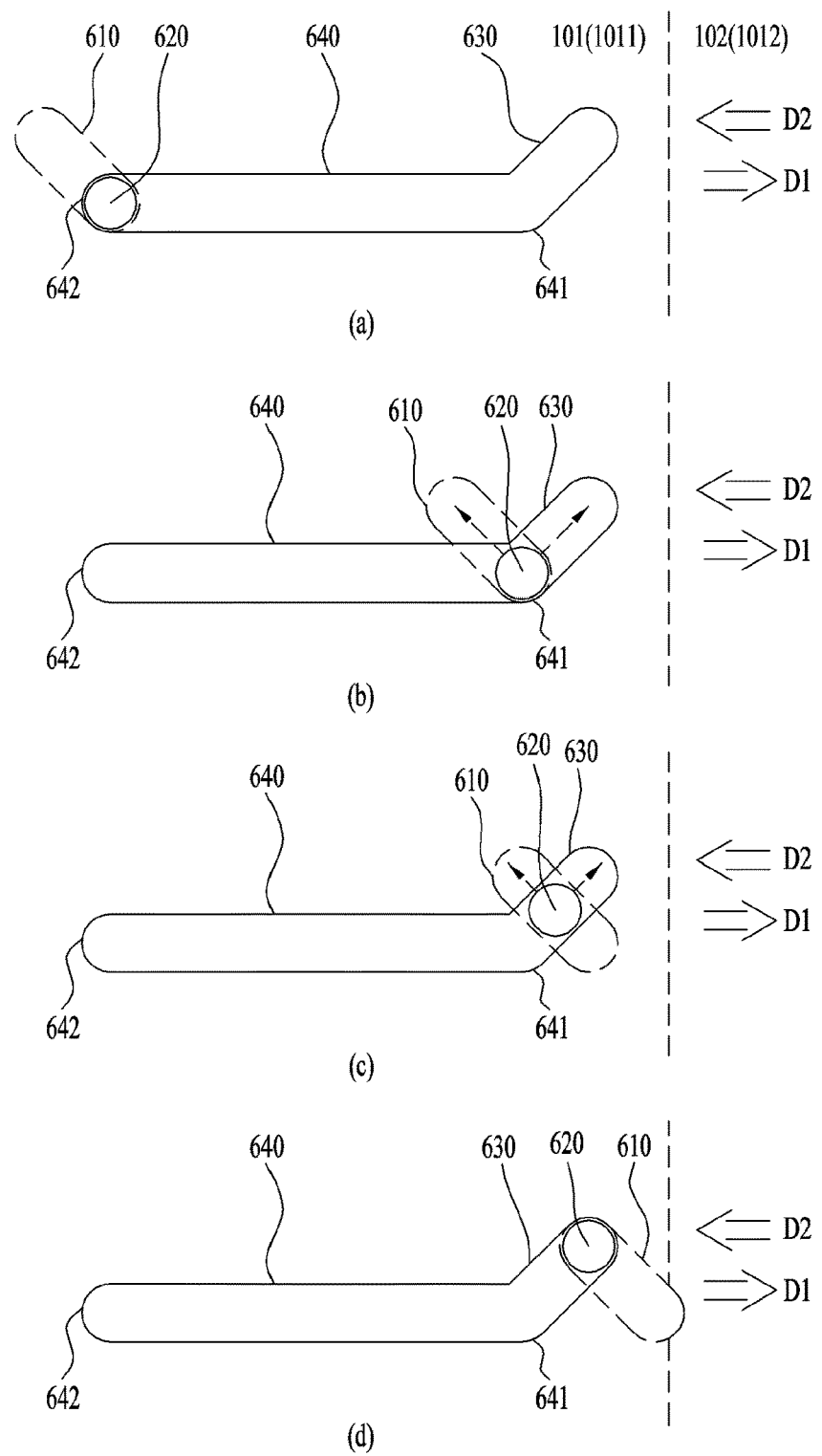
FIG. 14 is a layout showing an operation of a locker in detail while a second frame is moving in a first direction.

FIG. 9 is a partially-cut perspective diagram showing a mobile terminal and an actuator and damper of a manual drive unit provided to the mobile terminal, FIG. 10 is a partial perspective diagram showing the actuator of FIG. 9 in detail, FIG. 11 is a partial perspective diagram showing the damper of FIG. 9 in detail, FIG. 12 is a partially-cut perspective diagram showing a locker of a manual drive unit provided within a mobile terminal, FIG. 13 is a cross-sectional diagram obtained along a cutting line I-I of FIG. 12, and FIG. 14 is a layout showing an operation of a locker in detail while a second frame is moving in a first direction. Among the above drawings, FIG. 9 and FIG. 12 are perspective diagrams showing the backside of the mobile terminal 100 like FIG. 4. In order to show the inside of the mobile terminal 100 well, FIG. 9 and FIG. 12 show the mobile terminal 100 from which rear components, e.g., first and second rear parts 1011 and 1013 of a first frame 101, a third rear part 1022 of a second frame 102, a third frame 103, a display 151 and the like are removed. Furthermore, unlike the aforementioned configuration, in FIG. 9 and FIG. 12, a second front part 1021 of the second frame 102 is disposed to confront a front side (i.e., a rear side in the drawings) of the front part 1011 instead of a rear side to show a drive unit better. Yet, considering the configuration of the drive unit described later, the drive unit is exactly applicable to the mobile terminal 100 having the second front part 1012 of the second frame confronting the rear side of the first front part 1011, as described in the foregoing description. The drive unit, i.e., the manual drive unit is described in detail with reference to those drawings.

Like the above-described drive unit 200, as a drive unit is configured to control a motion of the mobile terminal 100, it is applicable to the relatively moving components thereof, e.g., the frames 101 to 103. For example, although the drive unit is described in the following as applied to the first and second frames 101 and 102 basically, it is identically applicable to a combination of the first and third frames 101 and 103 or a combination of the second and third frames 102 and 103.

First of all, referring to FIG. 9 and FIG. 10, the above-described drive unit may include an actuator 400 coupled to each of the first and second frames 101 and 102. The actuator 400 may be basically configured to guide the relative motions of the first and second frames 101 and 102 by an external force, i.e., a force applied by a user. The actuator 400 may be configured to move the second frame 102 relatively to the first frame 101 by self-generating a drive force. To perform such a function, various mechanisms are applicable. According to such mechanisms, the actuator 400 may include an elastic member 410 that is elastically deformed by an external force or restored elastically by removing such an external force. As shown in the drawing, the elastic member 410 may include an elastic spring for example. The elastic spring performs the intended elastic deformation and restoration and may have a small size suitable to be installed in a limited inner space of the mobile terminal 100.

Particularly, the actuator 400, i.e., the elastic member 410 may extend over the first and second frames 101 and 102 along a first direction D1 or a second direction D2. The actuator 400, i.e., the elastic member 410 may include a first end 410a coupled to the first frame 101, and more specifically, to a first front part 1011 of the first frame 101 and a second end 410b coupled to the second frame 102, and more specifically, to a second front part 1021 confronting the first front part 1011. Positions of the coupled portions of the first and second frames 101 and 102 and the first and second ends 410a and 410b may be appropriately selected so as not to interfere with internal components of the mobile terminal 100.

In addition, since the actuator 400, i.e., the elastic member 410 repeats the deformation and restoration in the course of the relative movement of the second frame 102 to the first frame, it is necessary not to interfere with the internal components of the mobile terminal 100 for the intended operation. Hence, the actuator 400 may include a guide configured to protect the elastic member from peripheral components. As such a guide member, as well shown in FIG. 10, the actuator 400 may include a first rail 420. The first rail 420 may be coupled to the first frame 101, and more specifically, to the first front part 1011 thereof, and may be extended along the first or second direction D1 or D2 like the elastic member 410. The first rail 420 also includes the elastic member 410, and more specifically, the first end 410 thereof, thereby being configured to receive a portion of the elastic member 410 therein. As shown in the drawing, the first rail 420 may have a channel shape having an open portion for example or a hollow pipe shape enclosing the elastic member 410 entirely. Meanwhile, as a guide member, the actuator 400 may include a second rail 430. The second rail 430 may be coupled to the second frame 102, and more specifically, to the second front part 1021 thereof, and may be extended along the first or second direction D1 or D2 like the elastic member 410 and the first rail 420. The second rail 430 is disposed to oppose the first rail 420, and may be configured to receive a portion of the elastic member 410 by including the elastic member 410, and more specifically, the second end 410b. Like the first rail 429, for example, the second rail 430 may have a channel shape having an open portion or a hollow pipe shape enclosing the elastic member 410 entirely.

As described with reference to FIG. 5 and FIG. 8, while the second frame 102 is moving in the first or second direction D1 or D2 relatively to the first frame 101 for the switching to the first or second state, a relative distance between the first and second frames 101 and 102 is increasing or decreasing. The first and second rails 420 and 430 are configured to change the relative distance between the first and second rails 420 and 430 according to the change of such a relative distance or spacing, whereby the smooth relative motion of the first and second frames 101 and 102 may be allowed. As well shown in FIG. 10, to enable such a relative motion, the second rail 430 may be movably coupled to the first rail 420. Particularly, the second rail 430 is partially inserted in the first rail 420, and may be configured to slide on the first rail 430. Hence, the second rail 430 may smoothly move together with the second frame 102 by changing the relative distances to the first rail 420 and the first frame 101. Since the second rail 430 is coupled to the first rail 420, the first and second rails 420 and 430 construct a single extended rail that always receives the elastic member 410 entirely, thereby securing the smooth operation of the actuator 400 while excluding the interference with the peripheral components.

Under such configuration of the actuator 400, if a user or the drive unit 200 applies a force to the second frame 102 in the first direction D1 in the first state shown in FIG. 9 (a), the second frame 102 may move in the first direction D1. By the movement of the second frame, the elastic member 410 is deformed under the protection of the first and second rails 420 and 430 and the mobile terminal 100 may switch to the second state shown in FIG. 9 (b). Namely, in the movement of the second frame 102 in the first direction D1, the elastic member 410 may be stretched. Since such stretch (i.e., tension) needs a considerable force due to the elasticity of the elastic member 410, it may work as a sort of resistance. Hence, the elastic member 410 prevents the rapid movement of the second frame 102 in the first direction D1 and may guide the smooth movement of the second frame 102. Alternatively, in the state shown in FIG. 9 (b), if an external force is removed by a user or a force is applied to the second frame 102 in the second direction D2 by the user/drive unit 200, the elastic member 410 may be restored, i.e., contracted to an original size under the protection of the first and second rails 420 and 430. The elastic member 410 stores the force applied during the deformation or stretch by the movement of the second frame 102 in the first direction D1 as an elastic force in a prescribed size and may apply such an elastic force to the second frame 102 for restoration or contraction. Hence, the elastic member 410 may generate a drive force for moving the second frame 102 in the second direction D2. By such a drive force, the second frame 102 may be moved in the second direction D2 and the mobile terminal 100 may be smoothly switched to the first state shown in FIG. 9 (a). Such an operation of the actuator 400 may be identically performed in case that the second frame 102 is manipulated by the automatic drive unit 200 instead of a user.

For more stable motion of the second frame 102, the mobile terminal may include a multitude of the actuators 400. For example, as shown in FIG. 9, the mobile terminal 100 may include actuators 400 disposed on the top and bottom parts of the mobile terminal 100, respectively.

In some implementations, the drive unit 200 or the actuator 400 may instantly generate a great force in the first or second direction D1 or D2 owing to various factors. By such a great force, the second frame 102 is moved at an excessive speed to cause breakage or malfunction of the mobile terminal 100. Therefore, as shown in FIG. 9 and FIG. 11, the mobile terminal 100 may include a damper 500 configured to reduce the moving speed of the second frame 102 in the first or second direction as a manual drive unit. The damper 500 may employ various mechanisms. And, a fluid mechanism configured to generate a prescribed force using a pressure of fluid may apply to the damper 500. The fluid mechanism may include a hydraulic device that uses oil as working fluid or a pneumatic device that uses air as working fluid. As such a fluid mechanism in small size generates a great force, it may be suitable for the mobile terminal 100. As described later, using oil or air pressure, the fluid mechanism may be configured to generate a force in a direction opposite to a moving direction of the second frame 102, i.e., a direction of a drive force applied to the second frame 102. Although the damper 500 consisting of a hydraulic device is mentioned in the following description, a pneumatic device is applicable as the damper 500 with a structure similar to that of the hydraulic device described later.

The damper 500 may basically include a hydraulic device configured to connect the first and second frames 101 and 102 together. Hence, the damper 500 may apply a force to the second frame 102 relatively to the first frame 101 and adjust a moving speed of the second frame 102. Particularly, as shown in FIG. 9, the damper 500 may include a cylinder 510 coupled to the first frame 101, and more specifically, to the first front part 1011 thereof. And, the damper 500 may include a plunger 520 coupled to the second frame 101, and more specifically, to a second front part 1021 thereof and also coupled to the cylinder 510 movably in the first and second directions D1 and D2. Namely, one end portion of the plunger 520 may be coupled to the cylinder 510 and the other end portion may be coupled to the second frame 102. The cylinder 510 may be filled with prescribed fluid, e.g., oil or air. The end portion inserted into the plunger 520, and more specifically, into the cylinder 510 thereof may be configured to reciprocate in the first and second directions D1 and D2 within the cylinder 510 by receiving a pressure by the filling fluid. Hence, the plunger 520 receives the pressure by the filling fluid in a direction opposite to a moving direction in the cylinder 510, and such a pressure may apply a force to the second frame 102 in the opposite direction through the plunger 520. The cylinder 510 and the plunger 520 may be installed in the mobile terminal 100 in a manner opposite to the former description. Namely, the cylinder 510 may be coupled to the second frame 102 instead of the first frame 101 and the plunger 520 may be coupled to the first frame 101 instead of the second frame 102. According to this disposition, the damper 500 may perform the same function.

The damper 500 performs a reciprocating motion during the relative movement of the second frame 102 to the first frame 101 like the actuator 400. Hence, in order not to interfere with the internal components of the mobile terminal 100, the damper 500 may include a guide configured to protect the cylinder 510 and the plunger 520 similarly to the actuator 400. As shown in FIG. 11, the damper 500 may include a third rail 530. The third rail 530 may be coupled to the first frame 101, and more specifically, to the first front part 1011 thereof and extended along the first and second directions D1 and D2. And, the third rail 530 may be configured to receive the cylinder 510 therein. Meanwhile, as a guide member, the damper 500 may include a fourth rail 540. The fourth rail 540 may be coupled to the second frame 102, and more specifically, to the second front part 1021 thereof and extended along the first or second direction D1 or D2. The fourth rail 540 is disposed to oppose the third rail 530 and configured to receive the plunger 520 therein. As shown in the drawing, each of the third and fourth rails may have a channel shape having an open portion for example or a hollow pipe shape enclosing the whole damper 500, i.e., the cylinder 510 and the plunger 520.

Like the above-described first and second rails 420 and 430, in order to secure the smooth motion of the first and second frames 101 and 102 for generating the change of the relative distance, the third and fourth rails 530 and 540 may be configured to change the relative distance in between. As well shown in FIG. 11, to enable such a relative motion, the fourth rail 540 may be movably coupled to the third rail 530. Particularly, the fourth rail 540 may be configured to be partially inserted in the third rail 530 and slide on the third rail 530. Hence, the fourth rail 540 may smoothly move together with the second frame 102 by changing the relative distances to the third rail 530 and the first frame 101. Moreover, as the fourth rail 540 is coupled to the third rail 530, the third and fourth rails 530 and 540 configure a single extended rail configured to receive the while damper 500 all the time, thereby securing the smooth operation of the damper 500 while excluding the interferences with peripheral components.

Under the above configuration of the damper 500, if a user or the drive unit 200 applies a force to the second frame in the first direction D1 in the first state shown in FIG. 9 (a), the second frame 102 may move in the first direction D1 and the mobile terminal 100 may switch to the second state shown in FIG. 9 (b). The plunger 520 coupled to the second frame 102 moves in the first direction D1 for the cylinder 510. During this movement, as described above, a force is relatively applied to the second frame 102 in a direction opposite to the movement of the second frame 102, i.e., the second direction D2 by the fluid in the cylinder 510. Hence, any force rapidly increased in the first direction D1 is attenuated by the damper 500 and the second frame 102 may move stably. On the other hand, if the user or the drive unit 200 applies a force to the second frame 102 in the second direction D2 in the second state shown in FIG. 9 (b), the mobile terminal 100 may return to the first state shown in FIG. 9 (a). During this movement, as described above, the plunger 520 moves in the second direction D2 toward the cylinder 510, thereby applying a force to the second frame 102 relatively in a direction opposite to the movement of the second frame 102, i.e., the first direction D1 by the fluid in the cylinder 510. Hence, any force rapidly increased in the second direction D2 may be attenuated and the second frame 102 may move stably.

In some implementations, after the mobile terminal 100 has switched to the second state, if the second frame 102 is moved in the second direction D2 by various factors, e.g., a shock applied to the mobile terminal 100, an extended screen formed on the front side of the mobile terminal 100 may be reduced unintentionally. Due to such reduction, the mobile terminal 100 is unable to appropriately provide a user with an interface and content adjusted suitable for the extended screen, whereby reliability and stability of the mobile terminal 100 may be degraded. For this reason, as a drive unit, the mobile terminal 100 may include a locker 600 configured to maintain the second frame 102 having been moved in the first direction D1, i.e., maintain the state or position of the moved second frame 102. Namely, the locker 600 may be configured to enable the second frame 102 maintain the position to which the second frame 102 has been fully moved in the first direction D1 for the switching to the second state and also configured to maintain the second state achieved by the above movement of the second frame 102. Furthermore, the locker 600 may be configured to hold or arrest the second frame 102 having been moved in the first direction D1 to maintain the second state. Such a locker 600 is described in detail with reference to FIGS. 12 to 14 as follows.

First of all, the locker 600 is basically provided to eh second frame 102 and may include a latch 620 that arrests the second frame 102 in the first frame 101. If the second frame 102 is moved in the first direction D1, i.e., if the mobile terminal 100 switches to the second state, the latch 620 is configured to immovably engage with the first frame 101, whereby the second frame 102 having the latch 620 may be immovably arrested or locked in the first frame 101 likewise. For the arrest of the second frame 102, the latch 620 collaborates with other components of the locker 600. And, configurations of such components are described below together with the latch 620.

The locker 600 may include a first slot 610 formed in a prescribed length at the second frame 102, and more specifically, at a lateral part of the second frame 102 adjacent to the first frame 101. As shown in FIG. 13, the first slot 610 may be configured to receive the latch 620 movably. Particularly, the first slot 610 may include flanges 611 extended inward from both sidewalls thereof. The flanges 611 are spaced apart in a prescribed distance from the bottom of the first slot 610. By such spacing, recesses 612 may be relatively formed in the both sidewalls of the first slot 610. By such flanges 611 and recesses 612, as described later, the latch 620 may freely move along the first slot 610 without being separated from the first slot 610. As described above, the locker 600 may include the latch 620 configured to engage with the first frame 101 and received movably in the first slot 610. As shown in FIG. 13, the latch 620 may have a column member in a prescribed length, e.g., a body 621 in a pin shape. The latch 620 may have a protrusion 622 extended in a radial direction from an outer circumference of the body 621. The protrusion 622 may be inserted in the recess 612 of the first slot 610. Hence, the latch 620 is not separated from the first slot 610 owing to the protrusion 622 caught at the flange 611 extended along the first slot 610 and may likewise move by being guided by the recess 612 extended along the first slot 16. And, the latch 620, and more specifically, the body 611 thereof may be projected from the second frame 102 and the first slot 610 so as to engage with the first frame 101.

The locker 600 may include a second slot 630 formed in the first frame 101, and more specifically, in a lateral part of the first frame 101 adjacent to the second frame 102. The second slot 630 may be configured to overlap with the first slot 610, while the second frame 102 is moving in the first direction D1, so as to communicate with each other. Hence, while the second frame 102 is moving in the first direction D1 at least, the latch 620 in the first slot 610 may be inserted in the second slot 630. If such a movement is completed, the latch 620 may engage with the second slot 630, and more specifically, with a wall thereof so as to arrest the second frame 102 on the first frame 101. The second slot 630 may be oriented so as to be inclined at a prescribed angle for the first and second directions D1 and D2, whereby the latch 620 may stably engage with the second slot 630. In association with the second slot 630, the first slot 610 may be configured to be inclined in a direction opposite to the second slot 630 at a prescribed angle for the first and second directions D1 and D2. Namely, as shown in the drawings, the first and second slots 610 and 630 may cross with each other while the second frame 102 is moving in the first direction D1. Therefore, the latch 620 is trapped within the crossing portion of the first and second slots 610 and 630, whereby the latch 620 may arrest the second frame 102 by engaging with the first frame 101 more stably and securely.

In some implementations, the relative distance between the first and second frames 101 and 102 changes in the course of the state switching of the mobile terminal 100, and the second frame 102 may move while overlapping with the first frame 101. Yet, as discussed above, since the latch 620 is projected from the second frame 102, it may interfere with the first frame 101 while the second frame 102 is moving. Hence, in order to exclude such interference, the locker 600 needs a path for moving the projected latch 620 in response to the changing relative distance between the first and second frames 101 and 102. For this reason, the locker 600 may include a third slot 640 configured to guide the latch 620 to move in the first or second direction D1 or D2 within the first frame 101. The third slot 640 is extended long in the first frame 1101 along the first and second directions D1 and D2, and may be connected to the second slot 630 formed in the first frame 101 to allow the latch 620 to move in the first frame 101. Particularly, the third slot 640 may include a first end 641 connected to an end of the second slot 630 and a second end 642 spaced apart from the first end 641 by opposing the first end 641. The third slot 640 forms a single long extended slot together with the second slot 630, thereby enabling the projected latch 620 to smoothly move along the first frame 101 while the second frame 102 is moving.

An operation of the locker 500 is described below in detail with reference to FIG. 12 and FIG. 14. In FIG. 14, a dotted line indicates a lateral part of the first frame 101 adjacent to the second frame 102. Hence, with reference to the dotted line, a left region in FIG. 14 indicates the first frame 101, i.e., the first front part 1011 and a right region indicates the moving second frame 102, i.e., the second front part 1021.

According to the dispositions and configurations of the first to third slots and latch 610 to 640, in the first state of FIG. 12 (a) and FIG. 14 (a), i.e., the contracted mobile terminal 100, the first slot 610 may be disposed in a manner of being spaced long apart from the second slot 630. Hence, the first slot 610 may overlap and communicate with the third slot 640 connected thereto, and more specifically, with the second end 642 thereof instead of the second slot 630. And, the latch 620 may be disposed in a state of being inserted in the crossing portions of the first and third slots 610 and 640. While the second frame 102 is moved by a user or the drive unit 200 in the first direction D1 for the switching to the second state of the mobile terminal 100, as shown in FIG. 14 (b), the latch 620 moves along the third slot 640 together with the first slot 610 and may then arrive at the connecting portion of the second and third slots 630 and 640, i.e., the first end 641 thereof. Thereafter, as shown in FIG. 14 (c), as the first slot 610 moves in the first direction D1, the latch 620 may move by following both of the first and second slots 610 and 630, as denoted by an arrow, owing to the first and second slots 610 and 630 inclined in opposite directions, respectively. Thereafter, as shown in FIG. 12 (b) and FIG. 14 (d), if the second frame 102 completely moves in the first direction D1 and the mobile terminal 100 switches to the second state, the end portion of the first slot 610 overlaps with the end portion of the second slot 630, whereby the latch 620 may be disposed within the end portions crossing with each other. As shown in the drawing, the crossing end portions of the first and second slots 610 and 630 form a single opening that completely surrounds the latch 620. Thus, the latch 620 is trapped not to move by the opening. Hence, the latch 620 may be arrested by the second frame 102 in a manner of stably engaging with the first frame 101. For this reason, the locker 600 may lock the second frame 102 in the first frame 101 so as to maintain the position of the second frame 102 having moved in the first direction D1, i.e., so as to enable the second frame 102 not to move in the second direction D2. On the other hand, in the second state shown in FIG. 12 (b) and FIG. 14 (d), if a great force in the second direction D2 works on the second frame 102, the first slot 610 is forcibly moved so that the latch 620 may be released from the crossing end portions of the first and second slots 610 and 630. Thereafter, the latch 620 may move in order reverse to the former description, and the mobile terminal 100 may finally switch to the first state shown in FIG. 12 (a) and FIG. 14 (a).

Figure 15:
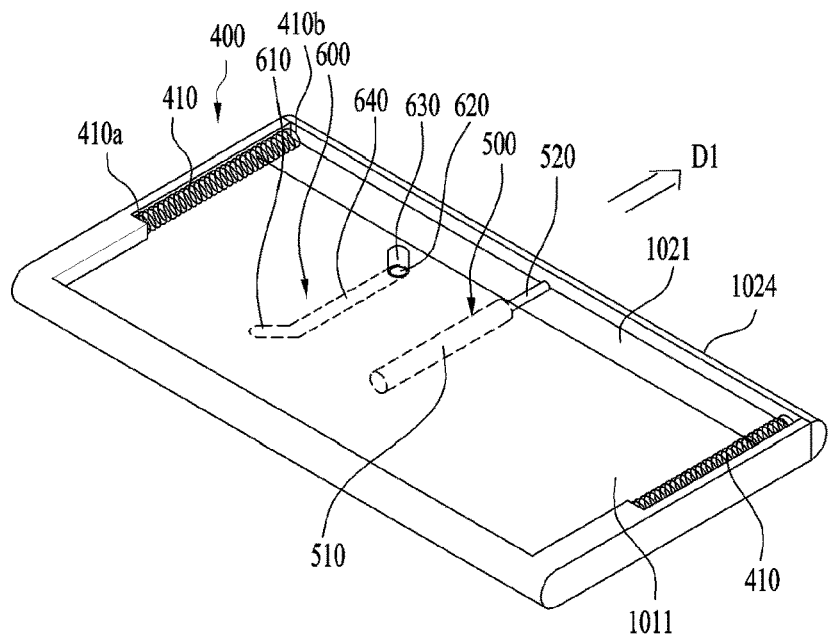
FIG. 15 is a partially-cut perspective diagram showing a modified example of the locker of FIG. 12.
Figure 15:
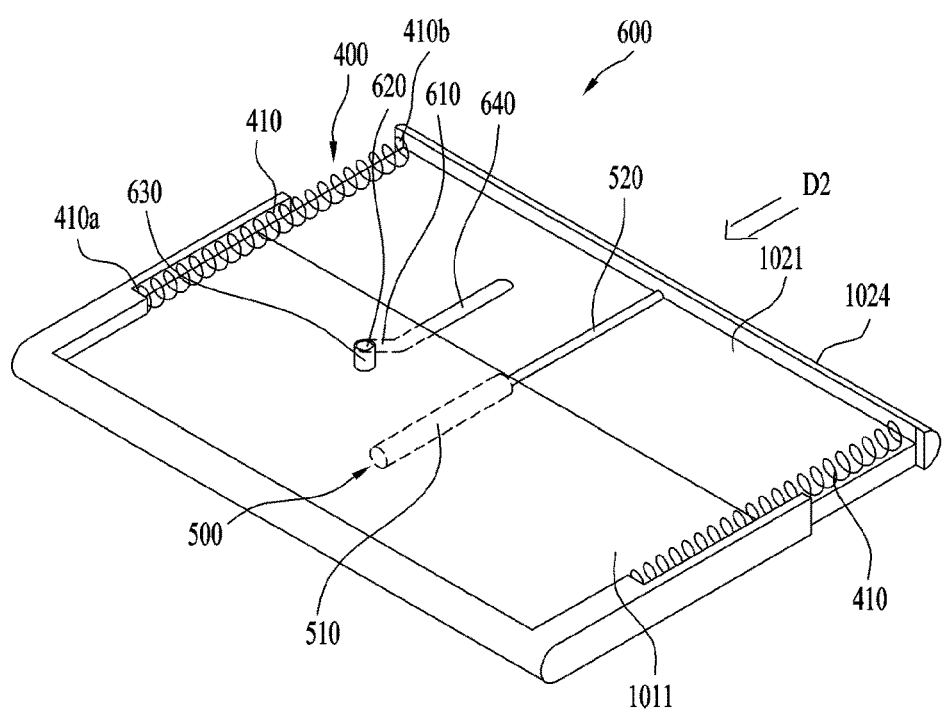
Figure 16:
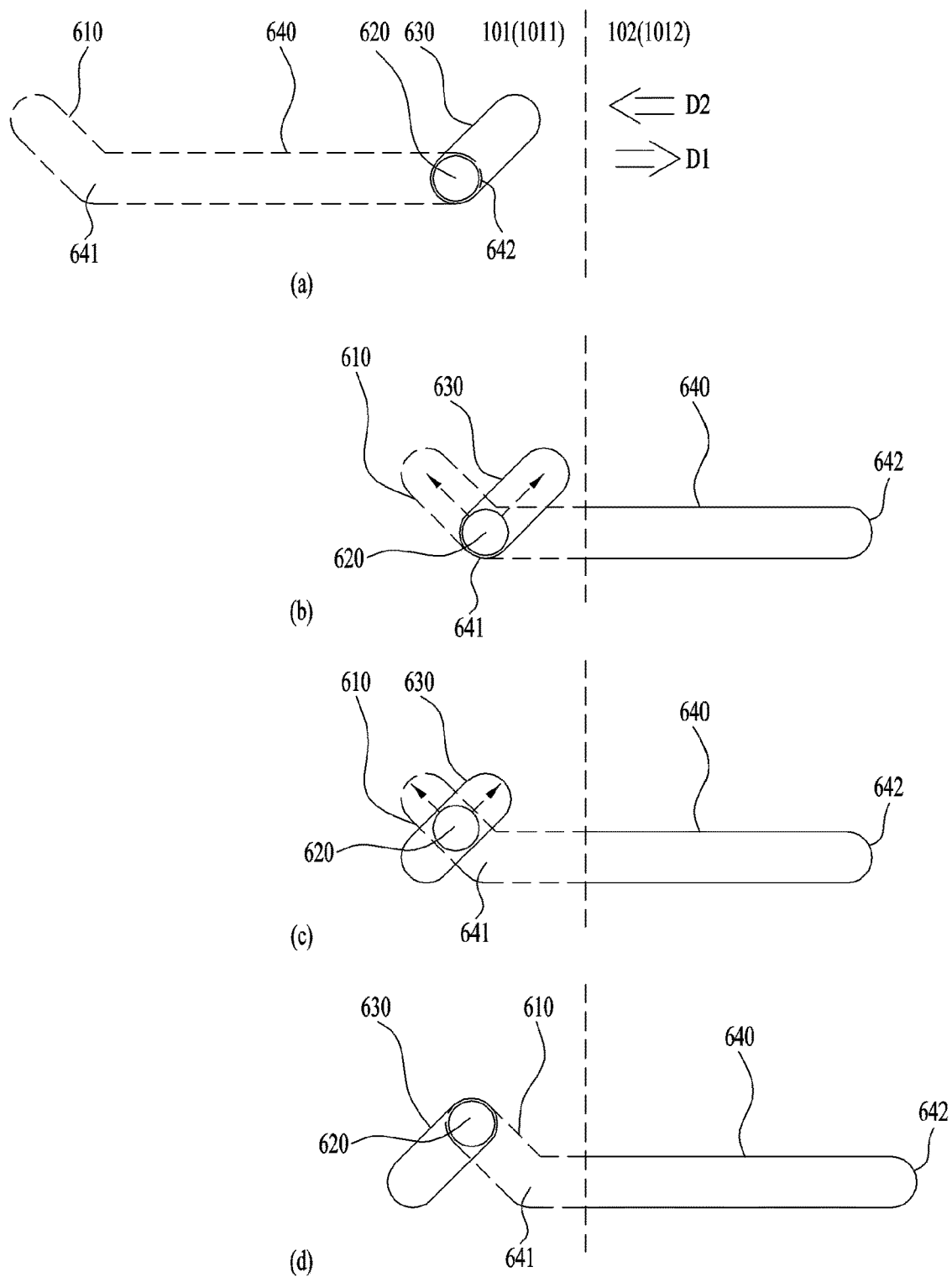
FIG. 16 is a layout showing an operation of a modified locker in detail while a second frame is moving in a first direction.

The above-described locker 600 may be modified into various shapes while performing the same function. For example, FIG. 15 and FIG. 16 show one of the modified examples of the locker 600. Particularly, FIG. 15 is a partially-cut perspective diagram showing a modified example of the locker of FIG. 12, and FIG. 16 is a layout showing an operation of a modified locker in detail while a second frame is moving in a first direction. With reference to these drawings, a modified example of the locker 600 is described below in detail.

Referring to FIG. 15 and FIG. 16, a modified example of the locker 600 may include first to third slots and latch 610 to 640 like the locker 600 shown in FIGS. 12 to 14. Among such components, the first and second slots 610 and 630 and the latch 620 may be configured to have the same structures and functions of the first and second slots 610 and 630 and the latch 620 of the former locker 600 shown in FIGS. 12 to 14. Hence, the description of the corresponding components of FIGS. 12 to 14 is exactly applied to the first slot 610, the second slot 630 and the latch 620 of the modified example, and additional description will be omitted from the following description. The third slot of FIGS. 12 to 14 is connected to the second slot 610. Yet, as shown in the drawing, the third slot 640 of the modified example of the locker 600 may be configured to be connected to the first slot 610. Particularly, in the modified example of FIG. 15 and FIG. 16, the third slot 640 is extended long from the second frame 101 along the first and second directions D1 and D2. And, the third slot 640 may be connected to the first slot 610 formed in the second frame 102 to allow the latch 620 to move in the second frame 102. In order for the latch 620 to smoothly move in the first and third slots 610 and 640 continuously, the third slot 640 may have the same configuration of the first slot 610 described with reference to FIG. 20. Namely, the third slot 640 may have the same flange 611 or recess 612. Particularly, the third slot 640 may include a first end 641 connected to the end of the first slot 610 and a second end 642 spaced apart from the first end 641 in a prescribed distance by opposing the first end 641. The third slot 640 forms a single slot extended long together with the first slot 610, whereby the projected latch 620 can move smoothly along the second frame 102 while the second frame 102 is moving.

Due to the above-distinguished third slot 640, an operation of the locker 600 according to the modified example differs from the locker 600 of FIGS. 12 to 14, and is described below in detail with reference to FIG. 15 and FIG. 16. In FIG. 16, a dotted line indicates a lateral part of the first frame 101 adjacent to the second frame 102. Hence, with reference to the dotted line, a left region in FIG. 16 indicates the first frame 101, i.e., the first front part 1011 and a right region indicates the moving second frame 102, i.e., the second front part 1021.

According to the dispositions and configurations of the first to third slots and latch 610 to 640, in the first state of FIG. 15 (*a*) and FIG. 16 (*a*), the first slot 610 may be disposed in a manner of being spaced long apart from the second slot 630. Hence, the second slot 630 may overlap and communicate with the third slot 640 connected thereto, and more specifically, with the second end 642 thereof instead of the first slot 610. And, the latch 620 may be disposed in a state of being inserted in the crossing portions of the second and third slots 630 and 640. While the second frame 102 is moved by a user or the drive unit 200 in the first direction D1, as shown in FIG. 16 (*b*), the latch 620 may move along the third slot 640 relatively to the third slot 630 moving together with the second frame 102 while being arrested in the second slot 630. By the movement according to the third slot 640, the latch 620 may then arrive at the connecting portion of the first and third slots 610 and 640, i.e., the first end 641 thereof. Thereafter, as shown in FIG. 16 (*c*), as the first slot 610 moves in the first direction D1, the latch 620 may move by following both of the first and second slots 610 and 630, as denoted by an arrow, owing to the first and second slots 610 and 630 inclined in opposite directions, respectively. Thereafter, as shown in FIG. 15 (*b*) and FIG. 16 (*d*), if the second frame 102 completely moves in the first direction D1 and the mobile terminal 100 switches to the second state, the end portion of the first slot 610 overlaps with the end portion of the second slot 630, whereby the latch 620 may be disposed within the end portions crossing with each other. As shown in the drawing, the crossing end portions of the first and second slots 610 and 630 form a single opening that completely surrounds the latch 620. Thus, the latch 620 is trapped not to move by the opening. Hence, the latch 620 may be arrested by the second frame 102 in a manner of stably engaging with the first frame 101. For this reason, like the locker 600 of FIGS. 12 to 14, the modified example of the locker 600 shown in FIG. 15 and FIG. 16 may lock the second frame 102 in the first frame 101 so as to maintain the position of the second frame 102 having moved in the first direction D1, i.e., so as to enable the second frame 102 not to move in the second direction D2. On the other hand, in the second state shown in FIG. 15 (*b*) and FIG. 16 (*d*), if a great force in the second direction D2 works on the second frame 102, the first slot 610 is forcibly moved so that the latch 620 may be released from the crossing end portions of the first and second slots 610 and 630. Thereafter, the latch 620 may move in order reverse to the former description, and the mobile terminal 100 may finally switch to the first state shown in FIG. 15 (*a*) and FIG. 16 (*a*).

Figure 17:
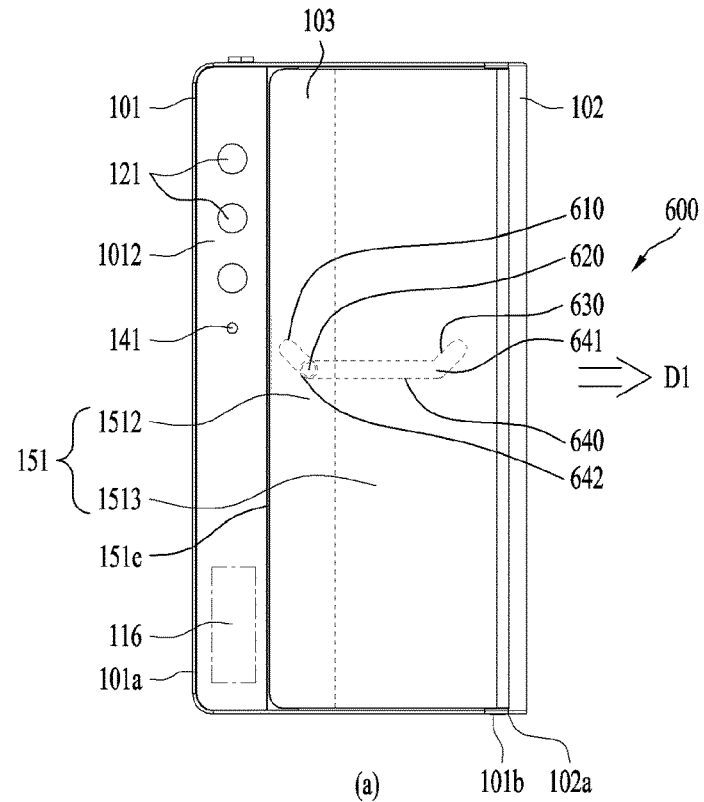
FIG. 17 is a backside diagram of a mobile terminal showing a modified example of a locker applied to second and third frames.
Figure 17:
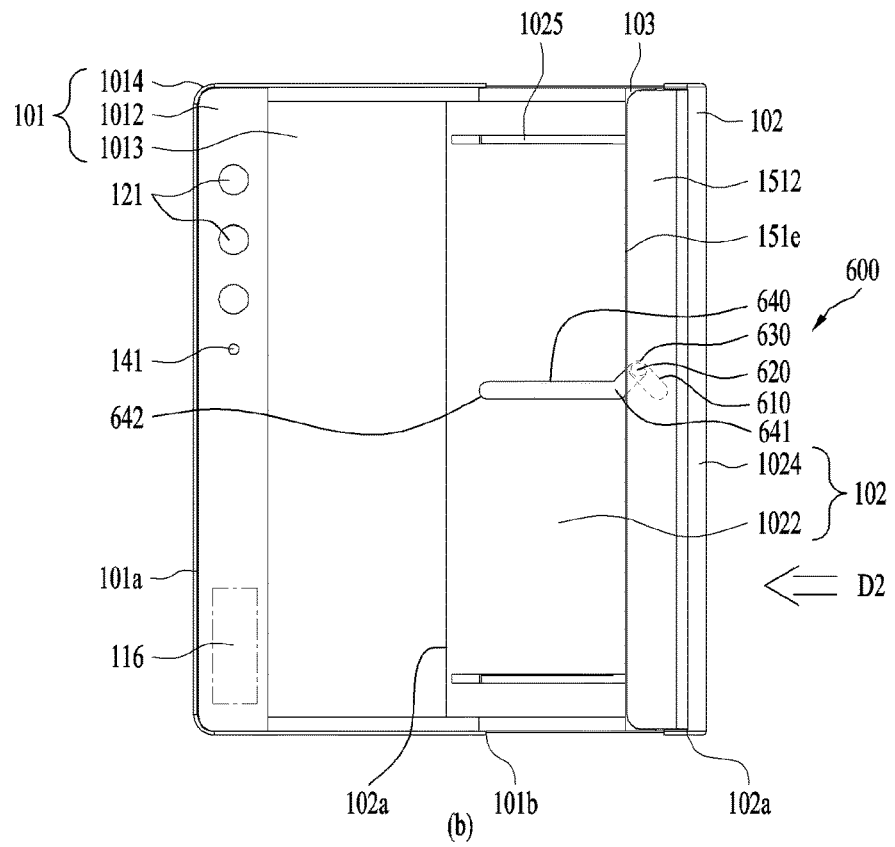

The locker 600 of FIGS. 12 to 13 is applicable to the second and third frames 102 and 103 performing a relative motion instead of the first and second frames 101 and 102 to perform the same function. A modified example of such a locker 600 is shown in FIG. 17. Particularly, FIG. 17 is a backside diagram of a mobile terminal showing a modified example of a locker applied to second and third frames. In FIG. 17, FIG. 17 (*a*) and FIG. 17 (*b*) show the first and second states of the mobile terminal 100, respectively.

As shown in FIG. 17, a modified example of a locker 600 may include first to third slots and latch 610 to 640 like the former locker 600 described in FIGS. 12 to 14. The first to third slots and latch 610 to 640 according to the modified example of FIG. 17 may be configured to have the same structures and functions of the first to third slots and latches 610 to 640 of the locker 600 of FIGS. 12 to 14, but installed positions thereof may be different from those of the corresponding components of the locker of FIGS. 12 to 14 only. Particularly, the first slot 610 may be provided to the third frame 103 moving relatively to the second frame 102, and more specifically, to a surface confronting the second frame. The latch 620 is disposed in the first slot 610, thereby being disposed in the third frame 103 together with the first slot 610. The second and third slots 630 and 640 may be provided to the second frame, and more specifically, to the third rear part 1022 confronting the third frame 103. The latch 620 may be projected from the first slot 610 toward the second frame 102 so as to be inserted in the second and third slots 630 and 640. The second and third slots 630 and 640 are connected to each other to form a single long slot in the second frame 102, thereby forming a path for allowing a movement of the projected latch 620 during the relative motion of the second and third frames 102 and 103. Owing to the aforementioned same configuration, the description of the corresponding components of FIGS. 12 to 14 is exactly applied to other features of the first to third slots and latch 610 to 640, and additional description will be omitted from the following description.

Owing to the dispositions and configurations of the first to third slots and latch 610 to 640 according to the aforementioned modified example, in the first state of FIG. 17 (a), the first slot 610 may overlap and communicate with the third slot 640, and more specifically, with the second end 642 thereof. And, the latch 620 may be disposed in a state of being inserted in the crossing portions of the first and third slots 610 and 640. As described with reference to FIG. 5 and FIG. 8, if the second frame 102 is moved by a user or the drive unit 200 in the first direction D1 relatively to the first frame 101, the third frame 103 may be moved in the first direction D1 relatively to the second frame 102 as well. By the movement of the third frame 103, the latch 620 may move along the third slot 640 together with the first slot 610 and arrive at the connecting portion of the second and third slots 630 and 640, i.e., the first end 641 thereof. Thereafter, as the first slot 610 moves in the first direction D1, the latch 620 may move by following both of the first and second slots 610 and 630 owing to the first and second slots 610 and 630 inclined in opposite directions, respectively. Thereafter, as shown in FIG. 17 (b), if the second and third frames 102 and 103 completely move in the first direction D1 and the mobile terminal 100 switches to the second state, the end portion of the first slot 610 overlaps with the end portion of the second slot 630, whereby the latch 620 may be disposed within the end portions crossing with each other. As shown in the drawing, the crossing end portions of the first and second slots 610 and 630 form a single opening that completely surrounds the latch 620. Thus, the latch 620 is trapped not to move by the opening. Hence, the latch 620 may arrest the third frame 103 in the second frame 102 in a manner of stably engaging with the second frame 102. For this reason, the locker 600 may lock the third frame 103 in the second frame 102 so as to maintain the position of the third frame 103 having moved in the first direction D1, i.e., so as to enable the third frame 103 not to move in the second direction D2. On the other hand, in the second state shown in FIG. 17 (b), if a great force in the second direction D2 works on the third frame 103, the first slot 610 is forcibly moved so that the latch 620 may be released from the crossing end portions of the first and second slots 610 and 630. Thereafter, the latch 620 may move in order reverse to the former description, and the mobile terminal 100 may finally switch to the first state shown in FIG. 17 (a). The former locker 600 of FIGS. 12 to 14 arrests the second frame 102 not to move. Yet, the locker 600 of the FIG. 17 may arrest the third frame 103 not to move. Therefore, the locker 600 of FIG. 17 is additionally included in the locker 600 of FIGS. 12 to 14, whereby the mobile terminal 100 may arrest both of the second and third frames 102 and 103. For this reason, the mobile terminal 100 may maintain the second state more stably and enhance reliability.

Figure 18:
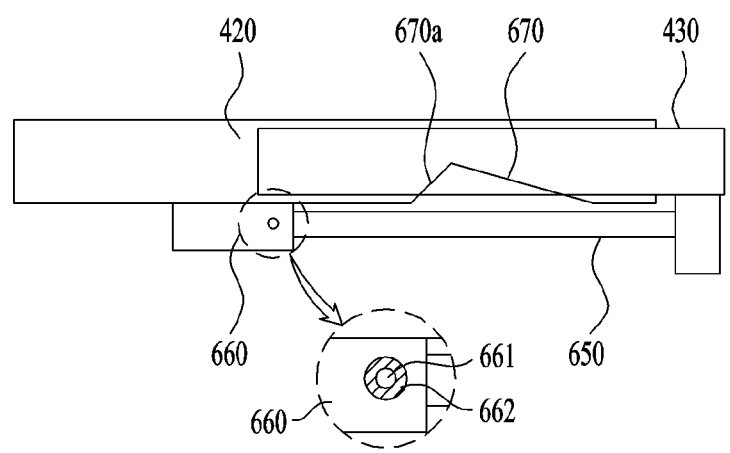
FIG. 18 is a layout showing a modified example of a locker provided to an actuator.
Figure 18:
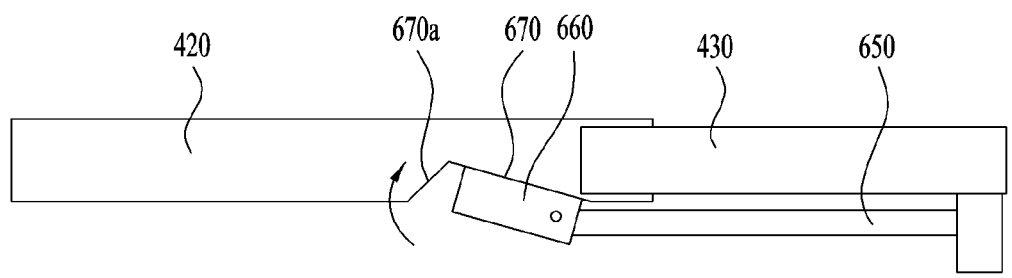

The mobile terminal 100 may include a locker 600 applied not to the frames 101 to 103 but to the actuator 400 to perform the same function, and such a locker 600 is shown in FIG. 18. FIG. 18 is a layout showing a modified example of a locker provided to an actuator. FIG. 18 (a) and FIG. 18 (b) show the first and second states of the mobile terminal 100, respectively.

As shown in FIG. 18, a modified example of the locker 600 may include a bar member 650 provided to the second rail 430 of the actuator 400. Not to interrupt the relative motion of the first and second rails 420 and 430, the bar member 650 may be coupled to a portion of the second rail 430, which is not coupled to the first rail 410, i.e., an end portion of the second rail 430. For the same reason, the bar member 650 may extend along the second rail 430 toward the first rail 420 while spaced apart from the first and second rails 420 and 430 in a prescribed distance. By such extension, as shown in the drawing, an end of the bar member 650 may be always disposed adjacent to the first rail 420 in both of the first and second states. The modified example of the locker 600 may include a head 660 installed at the end of the bar member 650. The head 660 may be configured to be rotatable toward the first rail 420 to engage with the first rail 420. Particularly, the head 660 may be coupled to the end of the bar member 650 using a hinge 661, and a torsion spring 662 may be provided between the hinge 661 and the head 660. The torsion spring 662 may be configured to apply a force to the head 660 toward the first rail 420 420 by being wound on an outer circumference of the hinge 661. Furthermore, the modified example of the locker 600 may include a notch 670 formed at the first rail 420. The notch 670 may be configured to receive the head 660 therein when the second frame 102 moves in the first direction D1. Particularly, the notch 670 is formed to correspond to a position of the head 660 when the second rail 430 is completely moved in the first direction D1 together with the second frame 102, whereby the rotated head 660 may be received in the notch 670.

Under the configuration of the locker 600, if a user or the drive unit 200 applies a force to the second frame 102 in the first direction D1 in the state shown in FIG. 18 (a), the second frame 102 may move in the first direction D1 and the mobile terminal 100 may switch to the second state shown in FIG. 18 (b). In the course of moving the second frame 102, the second rail 430 may move in the first direction D1 relatively to the first rail 420 together with the bar member 650 coupled thereto and the head 660. If the second frame 102 completely moves in the first direction D1, as shown in FIG. 18 (b), the head 660 may be aligned with the notch 670 of the first rail 420. Thereafter, by the force applied by the torsion spring 662, the head 660 may engage with the notch 670 by being rotated in a direction of the first rail 420. Hence, by the head 660 engaging with the notch 670, the second frame 102 coupled to the second rail 430 may be locked in the first frame coupled to the first rail 420 so as not to move. On the other hand, if the user or drive unit 200 applies a force to the second frame 102 in the second direction D2 in the second state shown in FIG. 18 (b), the second frame 102 may move in the second direction D2. By the movement of the second frame 102, the head 660 may rotate to get away from the first rail 420 so as to be released from the notch 670 while moving in the second direction D2 along a smoothly inclined surface 670a of the notch 670. Thereafter, the second rail 430 may continue to move in the second direction D2 together with the bar member 650 and the head 660, and the mobile terminal 100, as shown in FIG. 18 (a), may finally switch to the first state.

Figure 19:
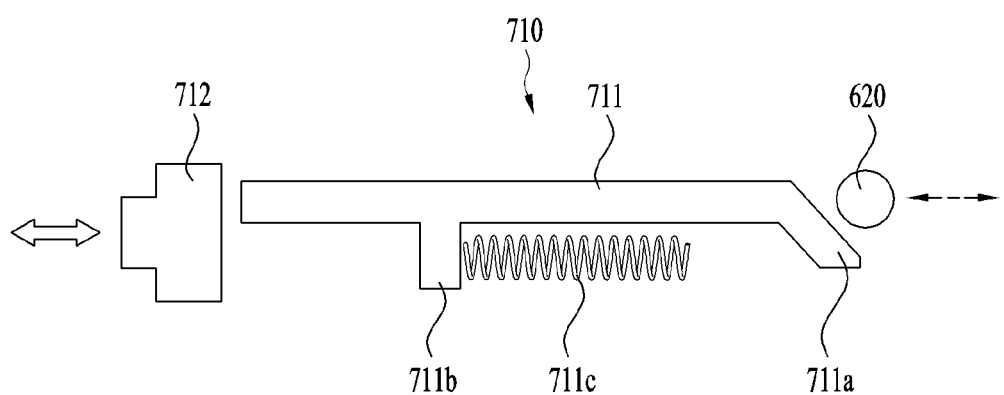
FIG. 19 and FIG. 20 are layouts showing a releaser of a manual drive unit.
Figure 20:
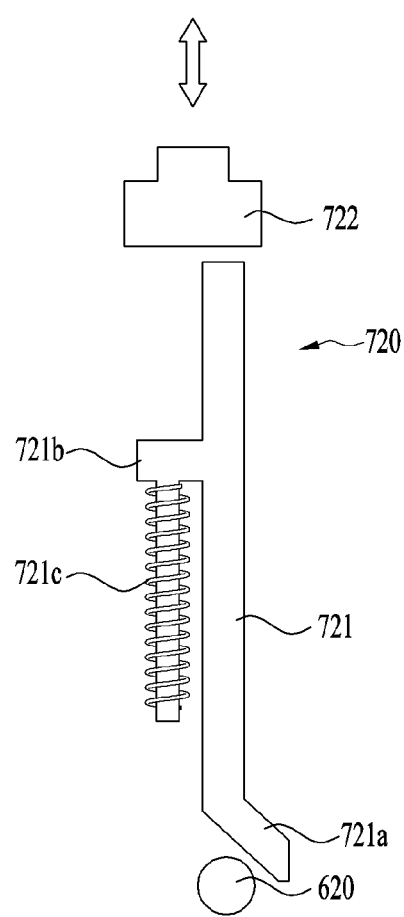

Meanwhile, as described above, the locker 600 may be released by a great force applied in the second direction D2. Yet, if such a force is repeatedly applied, components of the locker 600 may be broken or damaged. Hence, as a drive unit, the mobile terminal 100 may further include a releaser 700 configured to unlock the second frame 102 locked by the locker 600 to be movable in the second direction D2. In this regard, FIG. 19 and FIG. 20 are layouts showing a releaser of a manual drive unit. Moreover, FIG. 12 (b) shows position of first and second releasers 710 and 720 of FIG. 26 in the mobile terminal 100. With reference to these drawings, the releaser 700 is described in detail below.

As described above, the locker 600 may be configured to lock the second frame 102 using the latch 620 engaging with the first frame 101. Hence, the releaser 700 may be configured to disengage the latch 620 from the first frame 101. Such disengagement may be achieved by applying a force to the latch 620 in a horizontal or vertical direction approximately. For this reason, referring to FIG. 12 (*b*), FIG. 19 and FIG. 20, the releaser 700 may include a first releaser 710 configured to apply a force to the latch 620 in a horizontal direction, i.e., a direction side by side with the first and second directions D1 and D2 and/or a second releaser 720 configured to apply a force to the latch 620 in a vertical direction, i.e., a direction vertical to the first and second directions D1 and D2.

First of all, as shown in FIG. 19, the first releaser 710 may include a first rod 711 installed in the mobile terminal 100, i.e., inside a housing provided to the first and second frames 101 and 102. The first rod 711 may extend long in a horizontal direction within the mobile terminal 100. Particularly, the first rod 711 may be extended from a lateral part of the housing of the mobile terminal 100 to a position of the latch 620 in the second state, thereby applying a force to the latch 620 in the second state while being moved by an external force. In order not to interrupt the movement of the latch 620 during the movement of the second frame 102, the first rod 711 may include a return mechanism configured to return the first rod 711 to an original position in case of removing the external force. Such a return mechanism may include a flange 711*b* provided to the first rod 711 and an elastic member 711*c* deformed by the flange 711*b* in response to an external force. If the external force is removed, the elastic member 711*c* may be restored to return the flange 711*b* and the first rod 711 connected thereto to the original positions. Furthermore, the first rod 711 may include a pusher 711*a* provided to an end of the first rod 711 adjacent to the latch 620. The pusher 711*a* may include a rod or plate member extending by being inclined to the first rod 711. The pusher 711*a* forms a wide pressurizing plane so as to stably push the latch 620 in the horizontal direction. Meanwhile, the first releaser 710 may include a first button 712 disposed adjacent to the end of the first rod 711 confronting the housing of the mobile terminal 100. The first button 712 may be installed to be exposed out of the mobile terminal 100. The first button 712 may be configured to contact with the first rod 711 and apply an applied external force to the first rod 711 when the first button 712 is pushed at least. Hence, the first releaser 710 may be easily manipulated by the user from an outside of the mobile terminal 100. Regarding the first releaser 710, if a user pushes the first button 712, the first button 712 moves in the horizontal direction to move the first rod 711 in the horizontal direction. The first rod 711 then applies a force to the latch 620 in the horizontal direction, thereby disengaging the latch 620 from the first frame 101. If the user removes the force from the first button 712, the first rod and button 711 and 712 may return to original positions by the return mechanism 711*b* and 711*c*.

In addition, as shown in FIG. 20, the second releaser 720 may include a second rod 721 installed in the mobile terminal 100, i.e., inside a housing provided to the first and second frames 101 and 102. The second rod 721 may extend long in a vertical direction within the mobile terminal 100. Particularly, the second rod 721 may be extended from a top or bottom of the housing of the mobile terminal 100 to a position of the latch 620 in the second state, thereby applying a force to the latch 620 in the second state while being moved by an external force. In order not to interrupt the movement of the latch 620 during the movement of the second frame 102, the second rod 721 may include a return mechanism configured to return the second rod 721 to an original position in case of removing the external force. Such a return mechanism may include a flange 721*b* provided to the second rod 721 and an elastic member 721*c* deformed by the flange 721*b* in response to an external force. If the external force is removed, the elastic member 721*c* may be restored to return the flange 721*b* and the second rod 721 connected thereto to the original positions. Furthermore, the second rod 721 may include a pusher 721*a* provided to an end of the second rod 721 adjacent to the latch 620. The pusher 721*a* may include a rod or plate member extending by being inclined to the second rod 721. The pusher 721*a* forms a wide pressurizing plane so as to stably push the latch 620 in the vertical direction. Meanwhile, the second releaser 720 may include a second button 722 disposed adjacent to the end of the second rod 721 confronting the housing of the mobile terminal 100. The second button 722 may be installed to be exposed out of the mobile terminal 100. The second button 722 may be configured to contact with the second rod 721 and apply an applied external force to the second rod 721 when the second button 722 is pushed at least. Hence, the second releaser 720 may be easily manipulated by the user from an outside of the mobile terminal 100. Regarding the second releaser 720, if a user pushes the second button 722, the second button 722 moves in the vertical direction to move the second rod 721 in the vertical direction. The second rod 721 then applies a force to the latch 620 in the vertical direction, thereby disengaging the latch 620 from the first frame 101. If the user removes the force from the second button 722, the second rod and button 721 and 722 may return to original positions by the return mechanism 721*b* and 721*c*.

In some implementations, as described with reference to FIG. 5 and FIG. 8, while it is switched to the first or second state, the display 151 may move in the first or second direction D1 or D2 together with the second and third frames 102 and 103 as well. Unlike other components, as the display 151 is formed of flexible material, it may be deformed during such movement. For example, the display 151 may wobble instead of being spread flat while moving. If the display 151 fails to be unrolled flat, a screen size may not be formed precisely. For this reason, the mobile terminal 100 may include an auxiliary drive unit 800 configured to apply a tension to the display 151 in the course of moving the second and third frames 102 and 103 in the first and second directions D1 and D2. As described above, as the third frame 103 is provided to an end of the moving display 151, the auxiliary drive unit 800 may be provided across the first frame 101 and the third frame 103 moving relatively to the first frame 101.

Figure 21:
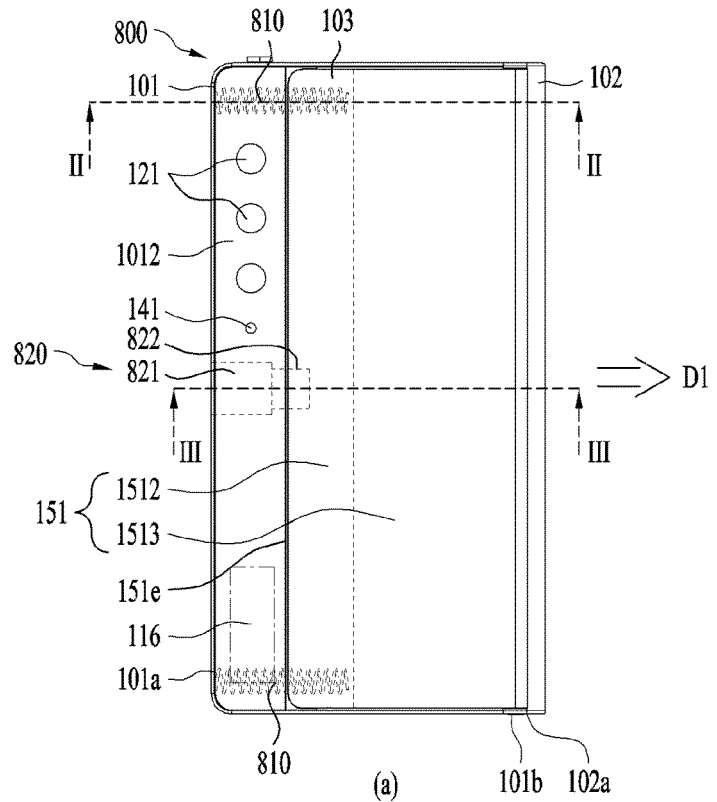
FIG. 21 is a backside diagram of a mobile terminal showing an auxiliary manual drive unit provided to a mobile terminal.
Figure 21:
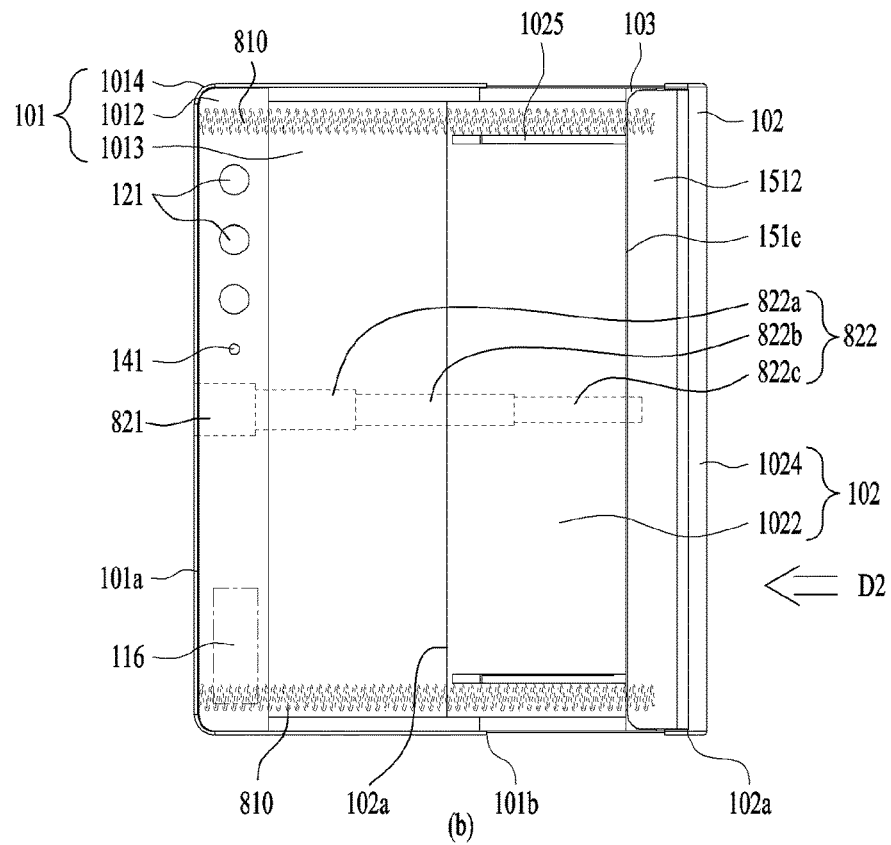
Figure 22:
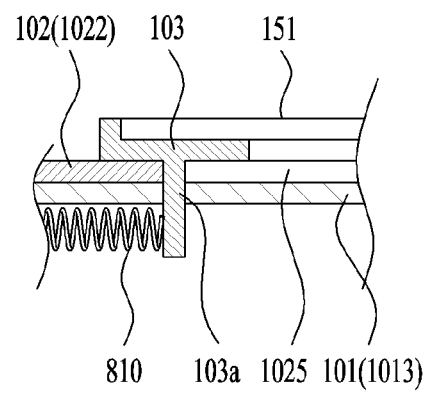
FIG. 22 is a cross-sectional diagram obtained along a cutting line II-II of FIG. 21.
Figure 23:
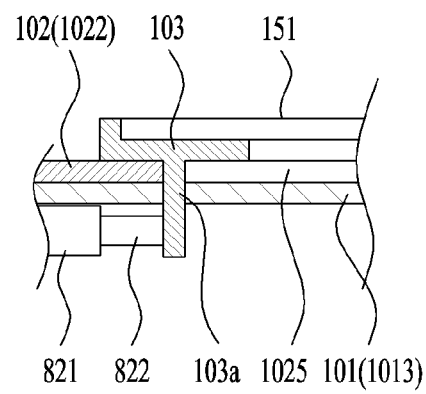
FIG. 23 is a cross-sectional diagram obtained along a cutting line of FIG. 21.

FIG. 21 is a backside diagram of a mobile terminal showing an auxiliary manual drive unit provided to a mobile terminal. FIG. 22 is a cross-sectional diagram obtained along a cutting line II-II of FIG. 21, and FIG. 23 is a cross-sectional diagram obtained along a cutting line of FIG. 21. The auxiliary drive unit 800 is described in detail with reference to these drawings as follows.

First of all, referring to FIG. 21, the auxiliary drive unit 800 may include an elastic member 810 coupled to each of the first and third frames 101 and 103. When the elastic member 810 is deformed (i.e., stretched) by an external force, it may resist against such deformation owing to elasticity of its own. If the external force is removed, the elastic member 810 may restored (i.e., contracted) into an original state by the elastic energy stored by the deformation. As shown in the drawing, the elastic member 810 may include an elastic spring for example. Particularly, the elastic member 810 may extend across the first and third frames 101 and 103 along the first or second direction D1 or D2. One end of the elastic member 810 may be coupled to a prescribed position of the first frame 101, e.g., a lateral part of the first frame 101. As shown in FIG. 22, the third frame 103 may have a protrusion, i.e., a bracket 103a extending into the mobile terminal 100 through a slot 1025 formed in the second frame 102 to guide a movement of the third frame 103, and the other end of the elastic member 810 may be coupled to the bracket 103a. The auxiliary drive unit 800 may include a multitude of elastic members 810 to apply tension to the display 151 stably. For example, the elastic members 810 may be disposed at the top and bottom parts of the mobile terminal 100, respectively.

The auxiliary drive unit 800 may include a hydraulic device 820 configured to connect the first and third frames 101 and 103 together. As discussed with respect to the damper 500, the hydraulic device 820 may relatively apply a force in a direction opposite to a direction of the force applied by pressure generated from the internal working fluid. For the same reason, the hydraulic device 820 may be substituted with a pneumatic device of the similar structure. Particularly, as shown in FIG. 21, the hydraulic device 820 may include a cylinder 821 coupled to the first frame 101. And, the hydraulic device 820 may include a plunger 822 coupled to the third frame 103 and also coupled to the cylinder 821 movably in the first and second directions D1 and D2. Namely, one end portion of the plunger 822 may be coupled to the cylinder and the other end opposed to the one end portion may be coupled to the third frame 103. As shown in FIG. 23, like the elastic member 810, the other end of the plunger 822 may be coupled to the bracket 103a of the third frame 103 projected into the mobile terminal 100 through the slot 1025 of the second frame 102. As described with reference to FIG. 8, the third frame 103 may move in a long distance d3 corresponding to two times of the moving distance d1 of the second frame 102. Hence, the plunger 822 may have a telescopic structure including a multitude of stages 822a, 822b and 822c and may be extended by the long moving distance d3 of the third frame 103.

Under the above configuration of the auxiliary drive unit 800, if a user applies a force in the first direction D1 to the second frame 102 in the first state shown in FIG. 21 (a), the second frame 102 moves in the first direction D1 relatively to the first frame 101 and the third frame 103 may also move in the first direction D1 relatively to the second frame 102. By such a movement of the third frame 103, the elastic member 810 may be deformed to be stretched. During such stretching, the elastic member 810 may generate resistance resistant to such deformation due to the elasticity. The resistance substantially includes tension working in a direction opposite to the first direction D1 and works on the third frame 103 and the end of the display 151, whereby the display 151 may be spread by the applied tension. Moreover, the plunger 822 coupled to the third frame 103 moves in the first direction D1 relatively to the cylinder 821. During such a movement, as described above, a force is applied to the third frame 103 in a direction opposite to the movement of the third frame 103, i.e., in the second direction D2 by the fluid in the cylinder 821. Hence, the display 151 may be spread by receiving the tension substantially. For this reason, in order to spread the display 151, during the movement of the third frame 103 in the first direction D1, the elastic member 810 and the hydraulic device 820 may apply the tension in the direction opposite to the first direction D1, i.e., in the second direction D2 to the third frame 103 and the display 151.

Alternatively, if an external force applied by a user is removed or the user applies a force in the second direction D2 to the second frame 102 in the second state shown in FIG. 21 (b), the second frame 102 moves in the second direction D2 relatively to the first frame 101 and the third frame 103 may also move in the second direction D2 relatively to the second frame 102. During such movements, the elastic member 810 may be restored, i.e., contracted into an original size. The elastic member 810 stores the force, which is applied during the deformation or stretching by the movement of the third frame 103 in the first direction D1, as an elastic force of prescribed strength and may apply the elastic force as tension to the third frame 103 in the second direction D2 during the restoration or contraction. Therefore, the display 151 may be spread by such tension. Meanwhile, during such movement, the plunger 822 moves relatively to the cylinder 821 and applies a force, as described above, to the third frame 103 in a direction opposite to the movement of the third frame 103, i.e., in the first direction D1 by the fluid in the cylinder 821. Therefore, owing to the force increased in the second direction D1 (e.g., the elastic force of the elastic member 810, the force of the user/drive unit 200, etc.), the third frame 103 may move stably and the display 151 may maintain a spread state stably.

Accordingly, the mobile terminal of the present disclosure has the following advantages and/or effects.

First of all, a mobile terminal according to the present disclosure may include a multitude of frames movably coupled to each other. By relative motion of the frames, extension and contraction of a flexible display, and more specifically, extension and contraction of a flexible display region exposed on a front side of the mobile terminal may be guided effectively. Therefore, by the combination of the flexible display and the frames, the mobile terminal may adjust a size of an available display or screen stably and reliably.

Secondly, a flexible display may be configured to be rolled in or out of a frame of a mobile terminal for extension and contraction. Since a deformed portion of the flexible display is changed continuously during such rolling, a specific portion of the flexible display may not be deformed continuously. Therefore, the specific portion of the flexible display may be protected from fatigue and breakage, whereby durability of the flexible display may be enhanced.

Thirdly, frames may be extended or contracted while a flexible display is extended or contracted. Therefore, the extended or contracted flexible display may be stably supported by such frames. Moreover, the frames are configured to cover a deformed portion of the flexible display, and more particularly, a rolled portion of the flexible display, thereby preventing the deformed portion of the flexible display from being broken by external shock.

Finally, a mobile terminal may include drive units configured to move frames automatically or manually. Theses drive units enable a flexible display to be extended or contracted according to user's intention conveniently and stably, and perform such extension and contraction precisely to enable the flexible display to implement an intended screen size precisely. And, the drive units are configured to play complementary roles, thereby enhancing stability and reliability of the mobile terminal significantly.

Effects of the present application are non-limited by the above-mentioned effects, and unmentioned other effects may be understood obviously and clearly by those skilled in the art from the description of the appended claims.

Although a number of representative examples are described above, it should be understood that numerous other modifications of these examples that fall within the spirit and scope of the principles of this disclosure can be devised by those skilled in the art. More particularly, various variations and modifications are possible within the scope of the disclosure, the drawings and the appended claims. In addition to variations and modifications, alternative uses will also be apparent to those skilled in the art.

What is claimed is:

1. A mobile terminal comprising:
 a first frame;
 a second frame movably coupled to the first frame and configured to move in a first direction against the first frame or in a second direction against the first frame, wherein the second direction is opposite to the first direction;
 a third frame movably coupled to the second frame and configured to move in the first direction or the second direction against the second frame;
 a flexible display comprising:
 a first region disposed on a front side of the mobile terminal and coupled to the first frame;
 a second region disposed on a rear side of the mobile terminal and coupled to the third frame; and
 a third region extending between the first region and the second region,
 wherein the third region is disposed on the front side or the rear side of the mobile terminal selectively according to a moving direction of the second frame based on being rolled around the second frame; and
 a driver configured to move the second frame in the first direction or the second direction against the first frame and to move the third frame in the first direction or the second direction against the second frame,
 wherein the driver is further configured to be operable manually.

2. The mobile terminal of claim 1,
 wherein the driver is further configured to switch the mobile terminal from being in a first state to being in a second state by moving the second frame and the third frame in the first direction to extend a screen on the front side of the mobile terminal,
 wherein only the first region of the flexible display is disposed on the front side of the mobile terminal when the mobile terminal is in the first state,
 wherein the third region of the flexible display is disposed on the mobile terminal together with the first region when the mobile terminal is in the second state, and
 wherein for switching of the mobile terminal to the second state, the driver is further configured to draw the third region away from the second region and to the front side of the mobile terminal in response to movement of the second frame in the first direction.

3. The mobile terminal of claim 2, wherein the driver is further configured to switch the mobile terminal from being in the second state to being in the first state by moving the second frame and the third frame in the second direction to reduce a size of the screen on the front side of the mobile terminal, and wherein the driver is further configured to contract the drawn-away third region from the front side of the mobile terminal to the second frame for switching of the mobile terminal to the first state.

4. The mobile terminal of claim 1, wherein the driver comprises an actuator coupled to each of the first frame and the second frame and configured to generate a drive force to move the second frame in the second direction.

5. The mobile terminal of claim 4, wherein the actuator comprises an elastic member configured to be deformed based on movement of the second frame in the first direction and to be restored based on movement of the second frame in the second direction.

6. The mobile terminal of claim 5, wherein the actuator further comprises:
 a first rail coupled to the first frame and configured to receive the elastic member; and
 a second rail configured to receive the elastic member therein by being coupled to the second frame and slidably coupled to the first rail.

7. The mobile terminal of claim 1, wherein the driver comprises a damper coupled to each of the first frame and the second frame and configured to reduce a moving speed of the second frame when the second frame moves in the first direction or the second direction.

8. The mobile terminal of claim 7, wherein the damper comprises a hydraulic device configured to connect the first frame and the second frame together.

9. The mobile terminal of claim 8, wherein the damper further comprises:
 a cylinder coupled to one of the first frame or the second frame and filled with a prescribed working fluid; and
 a plunger coupled to the other one of the first frame or the second frame and configured to reciprocate in the cylinder.

10. The mobile terminal of claim 1, wherein the driver comprises a locker configured to lock the second frame having moved in the first direction.

11. The mobile terminal of claim 10, wherein the locker comprises a latch and wherein the latch is configured to immovably engage with the first frame if the second frame moves in the first direction.

12. The mobile terminal of claim 11, wherein the driver further comprises a releaser configured to unlock the second frame locked by the locker, such that the second frame is movable in the second direction.

13. The mobile terminal of claim 12, wherein the releaser is configured to disengage the latch from the first frame.

14. The mobile terminal of claim 12, wherein the releaser is configured to be capable of being manipulated from outside of the mobile terminal.

15. The mobile terminal of claim 12, wherein the releaser comprises:
 a rod installed in the mobile terminal and configured to apply a force to the latch while being moved by an external force; and
 a button exposed outside of the mobile terminal and configured to apply a force to the rod while being operated by the external force.

16. The mobile terminal of claim 10, wherein the locker comprises:
 a first slot;
 a latch; and
 a second slot formed in the first frame to receive the latch therein and oriented such that the second slot is inclined at a particular angle with respect to the first direction, wherein if the second frame moves in the first direction, the latch is configured to engage with a wall of the inclined second slot.

17. The mobile terminal of claim 16, wherein the locker further comprises a third slot formed in the first frame to be connected to the second slot and to guide the latch to move in the first frame in the first direction or the second direction.

18. The mobile terminal of claim 16, wherein the first slot is configured to be inclined along a direction different from a direction of the second slot, and to be inclined at a particular angle with respect to the first direction.

19. The mobile terminal of claim 1, further comprising an auxiliary driver coupled to the third frame and the second frame and configured to apply tension to the third frame and the flexible display coupled to the third frame.

20. The mobile terminal of claim 19, wherein the auxiliary driver comprises either:
- an elastic member configured to apply a force to the third frame in a direction opposite to a moving direction of the third frame while deformed and restored; or
- a hydraulic device configured to apply a force to the third frame in the direction opposite to the moving direction of the third frame using an internal fluid pressure.

* * * * *